United States Patent
Cohen et al.

(10) Patent No.: US 9,381,512 B2
(45) Date of Patent: *Jul. 5, 2016

(54) HIGH EFFICIENCY AND HIGH PRECISION MICROFLUIDIC DEVICES AND METHODS

(71) Applicant: Fluidigm Corporation, South San Francisco, CA (US)

(72) Inventors: David S. Cohen, San Bruno, CA (US); Jing Wang, South San Francisco, CA (US); Andrew May, San Francisco, CA (US); Robert C. Jones, Los Altos, CA (US); Hany Nassef, San Mateo, CA (US)

(73) Assignee: Fluidigm Corporation, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,598

(22) Filed: Nov. 4, 2013

(65) Prior Publication Data

US 2014/0193896 A1    Jul. 10, 2014

Related U.S. Application Data

(60) Continuation of application No. 13/439,390, filed on Apr. 4, 2012, now Pat. No. 8,591,834, which is a division of application No. 12/018,138, filed on Jan. 22, 2008, now Pat. No. 8,157,434.

(60) Provisional application No. 60/934,499, filed on Jun. 13, 2007, provisional application No. 60/881,627, filed on Jan. 19, 2007.

(51) Int. Cl.
*B01L 3/00* (2006.01)
*F16K 99/00* (2006.01)
*B01L 7/00* (2006.01)

(52) U.S. Cl.
CPC ......... *B01L 3/502738* (2013.01); *B01L 3/5025* (2013.01); *F16K 99/0001* (2013.01); *F16K 99/0026* (2013.01); *F16K 99/0059* (2013.01); *B01L 7/52* (2013.01); *B01L 2200/0684* (2013.01); *B01L 2300/087* (2013.01); *B01L 2300/0816* (2013.01); *B01L 2300/0864* (2013.01); *B01L 2300/0874* (2013.01); *B01L 2300/0887* (2013.01); *B01L 2300/123* (2013.01); *B01L 2400/0487* (2013.01); *B01L 2400/0605* (2013.01); *B01L 2400/0638* (2013.01); *B01L 2400/0655* (2013.01); *F16K 2099/008* (2013.01); *F16K 2099/0074* (2013.01); *F16K 2099/0078* (2013.01); *F16K 2099/0084* (2013.01); *Y10T 137/0318* (2015.04); *Y10T 137/85938* (2015.04)

(58) Field of Classification Search
CPC ..................... B01L 3/5025; B01L 3/502738
USPC ............... 366/177.1, 182.4; 422/502, 537
See application file for complete search history.

(56) References Cited

U.S. PATENT DOCUMENTS

| | | | |
|---|---|---|---|
| 6,168,948 B1 * | 1/2001 | Anderson et al. | 435/287.2 |
| 6,883,957 B2 * | 4/2005 | Gilbert et al. | 366/152.1 |
| 7,815,868 B1 * | 10/2010 | Jones | B01F 5/0085 204/451 |
| 8,420,017 B2 * | 4/2013 | Jones | B01F 5/0085 422/129 |
| 8,591,834 B2 * | 11/2013 | Cohen et al. | 422/537 |
| 2003/0138829 A1 * | 7/2003 | Unger | B01L 3/502707 506/7 |

* cited by examiner

*Primary Examiner* — David Sorkin
(74) *Attorney, Agent, or Firm* — Kilpatrick Townsend & Stockton LLP

(57) ABSTRACT

New high density microfluidic devices and methods provide precise metering of fluid volumes and efficient mixing of the metered volumes. A first solution is introduced into a segment of a flow channel in fluidic communication with a reaction chamber. A second solution is flowed through the segment so that the first solution is displaced into the reaction chamber, and a volume of the second solution enters the chamber. The chamber can then be isolated and reactions within the chamber can be initiated and/or detected. High throughput methods of genetic analysis can be carried out with greater accuracy than previously available.

17 Claims, 15 Drawing Sheets

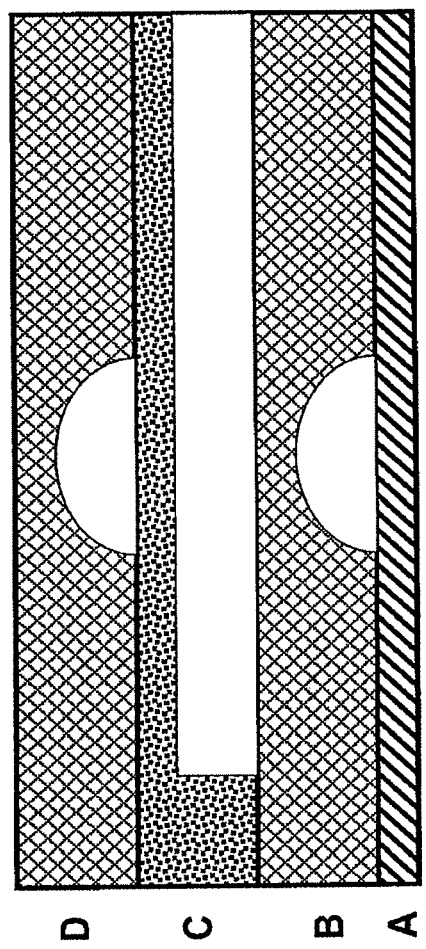

HIGH EFFICIENCY AND HIGH PRECISION MICROFLUIDIC DEVICES AND METHODS

CROSS REFERENCE TO RELATED APPLICATION

This application is a continuation of U.S. application Ser. No. 13/439,390, filed Apr. 4, 2012, which is a divisional of U.S. application Ser. No. 12/018,138, filed Jan. 22, 2008, now U.S. Pat. No. 8,157,434, which claims the benefit of U.S. Provisional Application No. 60/881,627, filed Jan. 19, 2007, and U.S. Provisional Application No. 60/934,499, filed Jun. 13, 2007. The contents of each aforelisted priority applications are incorporated herein by reference.

BACKGROUND

High density microfluidic devices are useful in a wide range of research, diagnostic and synthetic applications, including immunoassays, nucleic acid amplification and genomic analysis, cell separation and manipulation, and synthesis of radionuclides, organic molecules, and biomolecules. The advantages of microfluidic devices include conservation of reagents and samples, high density and throughput of sample analysis or synthesis, fluidic precision and accuracy, and a space reduction accompanying the replacement of counterpart equipment operating at the macrofluidic scale.

However, the manipulation of fluid volumes on the order of nanoliters and picoliters has required many new discoveries and design innovations. There are fundamental differences between the physical properties of fluids moving in large channels and those traveling through micrometer-scale channels. See, e.g., Squires and Quake, 2005, Rev. Mod. Phys. 77, 977-1026; Stone et al., 2004, Annu. Rev. Fluid Mech. 36:381-411; and Beebe et al., 2002, Ann. Rev. Biomed. Eng. 4:261-86. For example, at a microfluidic scale the Reynolds number is extremely small, reflecting a difference in the ratio of inertial to viscous forces compared to fluids at macroscale. Fluids flowing in microfluidic systems exhibit reduced turbulence, electro-osmotic and laminar flow properties, and in other ways behave differently than observed at a macroscale. There remains a need for new approaches to effecting efficient flow, containment and mixing of microfluids.

BRIEF SUMMARY OF THE INVENTION

New high density microfluidic devices and methods provide precise metering of fluid volumes and efficient mixing of the metered volumes. A first solution is introduced into a segment of a flow channel in fluidic communication with a reaction chamber. A second solution is flowed through the segment so that the first solution is displaced into the reaction chamber, and a volume of the second solution enters the chamber. The chamber can then be isolated and reactions within the chamber can be initiated and/or detected. High throughput methods of genetic analysis can be carried out with greater accuracy than previously available.

In one aspect the invention provides a microfluidic device comprising an array of fluidically interconnected unit cells, where each unit cell comprises (a) a first microfluidic flow path in fluid communication with: 1) a reaction chamber and 2) a first microfluidic bus line, where the first microfluidic bus line is in fluidic communication with a sample source reservoir; b) a first valve situated in the first microfluidic flow path; c) a second valve situated in the first microfluidic flow path; d) a second microfluidic flow path in fluidic communication with: 1) the first microfluidic flow path at a junction between the first and second valves, and 2) a second microfluidic bus line, where the second microfluidic bus line is in fluidic communication with a reagent source reservoir e) a third valve situated 1) in the second microfluidic flow path, or 2) in the second microfluidic bus line positioned between the microfluidic flow channel of the unit cell and the second microfluidic flow path of an adjacent unit cell.

In one aspect the invention provides a microfluidic device comprising an array of fluidically connected unit cells, where each unit cell comprises: a) a reaction chamber; b) a first microfluidic flow path having a proximal end and a distal end, where the first microfluidic flow path (i) is in fluidic communication at its proximal end with the reaction chamber and (ii) is in fluidic communication at its distal end with a first microfluidic bus line, where the first microfluidic bus line is in fluidic communication with (i) a sample source reservoir and (ii) a plurality of unit cells; c) a first valve and a second valve, where (i) the second valve is situated in the first microfluidic flow path and (ii) the first valve situated in the first microfluidic flow path between the first valve and the reaction chamber; where the fluid capacity of the segment of the first microfluidic flow path between the first valve and the second valve is less than the fluid capacity of the reaction chamber; d) a second microfluidic flow path in fluidic communication with the first microfluidic flow path at a junction located between the first and second valves; and in fluidic communication with a second microfluidic bus line, where the second microfluidic bus line is in fluidic communication with (i) a reagent source reservoir and (ii) a plurality of unit cells; e) a third valve situated a second microfluidic flow path between the second microfluidic bus line and the junction or in the second microfluidic bus line positioned between the microfluidic flow channel of the unit cell and the second microfluidic flow path of an adjacent unit cell; where the array comprises at least 16 unit cells grouped into at least 4 first sets (e.g., rows) and at least 4 second sets (e.g., columns) of unit cells; where the at least 16 unit cells are not members of more than one first set or more than one second set; where each unit cell of each the first set is fluidically linked to a different first microfluidic bus line; and where each unit cell of each the first set is fluidically linked to a different second microfluidic bus line.

In some versions of the device the third valve is situated in the second microfluidic flow path. In some versions of the device the reaction chamber is a dead-end chamber. In some versions, the array has at least 1000 unit cells. In some versions of the device, there is a check valve in the first microfluidic flow path between the reaction chamber and the first valve. In some versions of the device the second valve and/or the third valve is a check valve permitting flow only toward the reaction chamber.

The device is fabricated from elastomeric material(s). In some versions, the device has channel, segments in at least two different levels of the device. For example, the first microfluidic flow path may have channel segments in at least two different levels of the device. In some versions, the device includes at least one fluid communication via. In some versions of the device the first and second valves are regulated by a single push-up/push-down valve. In some versions the device may have a valve system with i) three on-off valves or ii) three on-off valves and one check valve or iii) two on-off and one or two check valves or iv) one on-off valve and two or three check valves.

In one aspect a method for mixing solutions in a microfluidic device is provided. The method may include the steps of introducing a first solution into a segment of a flow channel, where the flow channel is in fluidic communication with a reaction chamber; flowing a second solution through the segment, thereby displacing the first solution into the reaction chamber; and flowing the second solution into the reaction chamber, whereby mixing of the first and second solutions occurs in the reaction chamber. The method may include the further step of fluidically isolating the reaction chamber.

In embodiment the method may include i) introducing a first solution into a segment of a flow channel of a unit cell of the device, where the flow channel is in fluidic communication at a first end with a reaction chamber having fluid capacity N; where a first position in the flow channel is proximal to a second position if the first position is fluidically closer to the reaction chamber the second position, and is distal to the second position if the first position is fluidically further from the reaction chamber than the second position; where the flow channel segment is bounded by a first valve located in the flow channel and a second valve located in the flow channel, where the second valve is distal to the first valve; where the flow channel segment is in fluidic communication, through a first input junction, with a source of the first solution, the first input junction being positioned between the first valve and the second valve; where the flow channel segment is in fluidic communication, through a second input junction, with a source of the second solution, the second input junction being positioned distal to the second valve, where flow of the second solution from the source to is regulated by a third valve; where the fluid capacity of the flow channel segment is less than N; and where the first valve is closed when the first solution is introduced; where the second valve is in the closed when the first solution is introduced, or is a check valve that permits flow only toward the reaction chamber; where the third valve is positioned such that when the first valve is closed, the second valve is closed or is a check valve, and the third valve is closed or is a check valve that permits flow only toward the reaction chamber, the first solution is retained in the segment. If the third valve is not a check-valve, the method includes the step of closing the third valve. The method also includes the steps of iii) introducing the second solution into the segment. If the second valve is not a check valve, the introducing includes the steps of 1) flowing the second solution into a portion of the flow channel distal to the second valve before, after or concurrently with step (i) 2) opening the second valve; 3) opening the first valve; 4) flowing the second solution into the segment of the flow channel, thereby displacing the first solution into the reaction chamber; and 5) flowing the second solution into the reaction chamber. If the second valve is a check valve the introducing includes the steps of 1) flowing the second solution into the portion of the flow channel distal to the second valve; 2) opening the first valve; 3) flowing the second solution through the second valve, thereby displacing the first solution into the reaction chamber, and 4) flowing the second solution into the reaction chamber; whereby the first solution and the second solution are mixed in the reaction chamber. The method may include the further step of closing the first valve.

In some embodiments the device comprises an array of at least 1000, and the unit cells are grouped in an array comprising M rows of unit cells and N columns of unit cells, M>25 and N>25. In some embodiments the same first solution is introduced into each unit cell of a column and the same second solution is introduced into each unit cell of a row. In some embodiments first solutions contain reagents for amplification of a nucleic acid and the second solutions contain a nucleic acid sample.

In a related aspect the invention provides a method for combining two or more solutions in a microfluidic reaction chamber by introducing a predetermined volume of a first solution into a reaction chamber, introducing a predetermined volume of a second solution into a reaction chamber, and fluidically isolating the reaction chamber. Preferably the combined volumes of the first solution and the second solution equals the fluidic capacity of the reaction chamber. Preferably the volume of one of the solutions is at least twice the volume of the other solution.

BRIEF DESCRIPTION OF THE FIGURES

The figures are to illustrate feature of the invention and are not drawn to scale.

FIG. 8 shows a push-up/push down valve.

DETAILED DESCRIPTION

Figure 1:
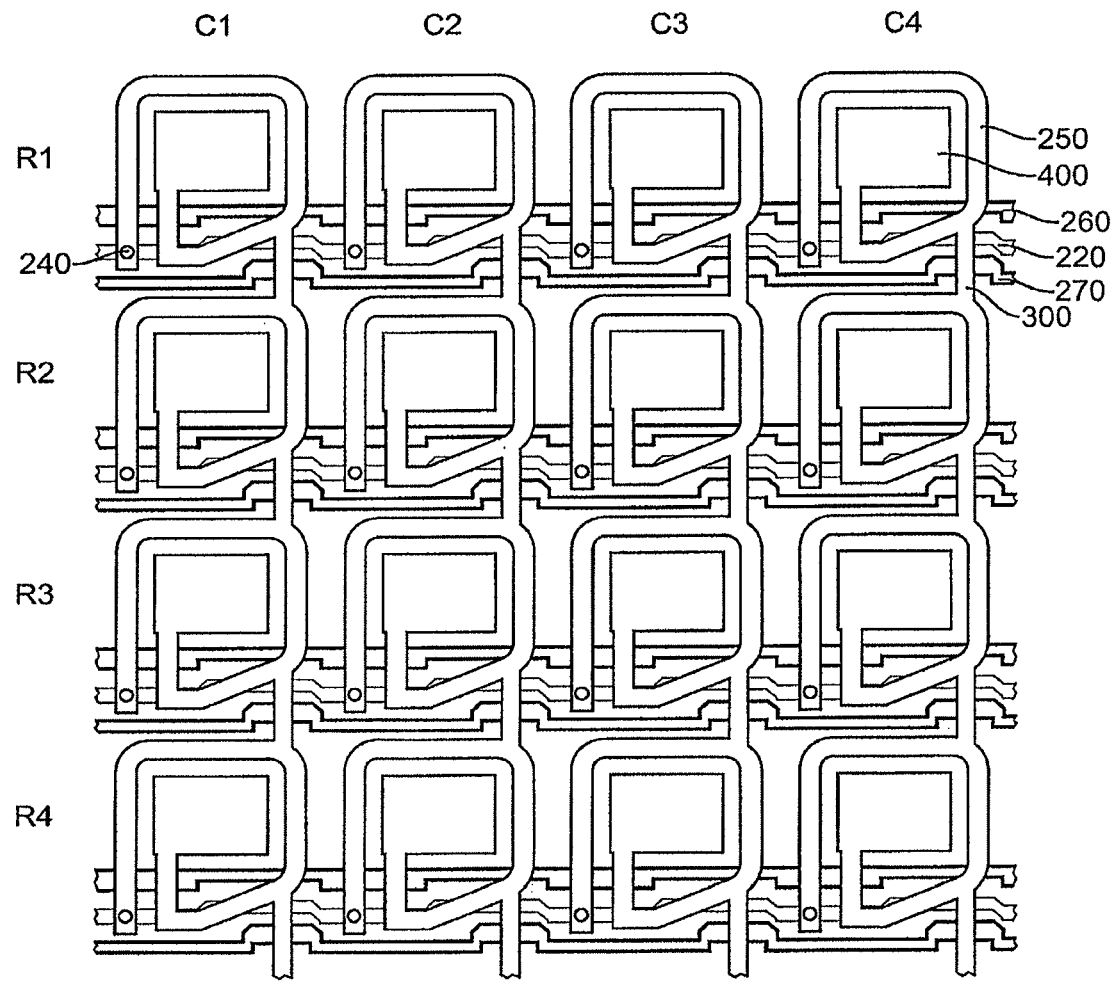
FIG. 1 is an illustration of flow paths and valves of a FCS device (Exemplar 1) showing a 4×4 array of cells. The cells are grouped by column (C1, C2, C3, C4) and row (R1, R2, R3, R4).

Rapid and efficient mixing in microfluidic devices is often critical to the effective function of a microfluidic device. However, the mechanics of mixing between two separated liquids in the microfluidic channels is quite different from the macro world. For a micrometer size channel, the typical value of diffusion coefficients, D, range between $10^{-5}$ cm$^2$ s$^{-1}$ at the high end (small molecule) to $10^{-7}$ cm$^2$ s$^{-1}$ at the low end (large molecule, such as genomic DNA). The diffusion time scale, $\tau \sim L^2/D$, (L is the length of character channel) may be seconds for a small molecule in a channel of 10 μm or hours for a large molecule in a channel of 100 μm. This invention relates to microfluidic devices and methods of using the devices that provide precise metering of fluid volumes and efficient mixing of the metered volumes. The methods, devices and components disclosed herein are useful for analytical assays for research or diagnostic purposes where high density, high throughput, sample parsimony, and lower cost are desired. The devices and methods are also useful as tools for the synthesis, sorting, and storage of high value chemical and biological entities, and other uses that will be apparent to the skilled reader.

I. Overview

The microfluidic devices of the present invention utilize a configuration in which at least one solution is metered into a segment of a flow channel, typically through a junction disposed between valves along the flow channel. The junction typically has an on/off valve or a one way check valve at the inlet portion of the junction. The flow channel valves that bracket the junction are closed and the junction inlet valve is opened. A solution is instilled into the segment of the flow channel. The filling of the segment is preferably performed by "blind filling" the segment. Blind filling takes advantage of the permeability of the material defining at least one side of the flow channel to gases and not to liquid. The first solution is filled into the flow channel segment by placing the solution under pressure at the junction and allowing the first solution to fill the segment as the gases that are present in the flow channel diffuse out through the gas permeable material. Once the segment of the flow channel defined by the valves is filled, the inlet junction is closed or allowed to close and a precisely defined volume is contained within the flow channel segment. The exact volume is determined by the flow channel dimensions and the spacing of the valves along the segment that are closed to define the blind filled portion of the flow channel. With the flow channel valves remaining closed, a second solution is introduced into an empty portion of the flow channel by blind filling against one of the closed valves. In one embodiment, the empty portion of the flow channel is adjacent to the segment of the flow channel. By maintaining the second solution under pressure and then opening the flow channel valves on the flow channel segment, the second solution pushes the first solution through the flow channel. In a preferred embodiment, the flow channel segment valve opposite the valve against which the second solution is blind filled, is adjacent to a reaction chamber of a defined volume. When the flow channel segment valves are opened, the second solution pushes the first solution into the reaction chamber. By fabricating the reaction chamber such that the reaction chamber volume is greater that the volume of the first solution in the flow channel, a precisely defined amount of the second solution is pushed into the reaction chamber along with the known volume of the first solution. The volume of the second solution that fills the reaction chamber is defined by the volume of the reaction chamber minus the volume of the first solution. As both solutions fill the reaction chamber, mixing of the solutions occurs.

II. Definitions

The following definitions are provided to assist the reader. In some cases, terms with commonly understood meanings in the microfluidic arts are defined herein for clarity and/or for ready reference, and the inclusion of such definitions herein should not be construed to represent a substantial difference over the definition of the term as generally understood in the art.

As used herein, "mixing" has its usual meaning. Two (or more) different solutions (e.g., aqueous solutions) are completely mixed when they are combined to produce a single homogenous solution. Put differently, a first solution containing a first solute and a second solution containing a second solute produce, when completely mixed, a solution in which both solutes are homogenously distributed. On a microfluidic (low Reynolds number) scale, mixing is almost exclusively diffusional rather than turbulent. Without intending to be bound by a specific mechanism, the present invention provides superior mixing by increasing the contact area (interface) between the solutions relative to prior microfluidic methods of combining solutions. Using methods of the invention, a larger interface between solutions is achieved both in the slug channel and reaction chamber. By increasing the surface area, the rate of diffusional mixing is increased.

As used herein, "flow channel" means a microfluidic flow channel. A microfluidic flow channel is a tube through which a solution (e.g., an aqueous solution) can flow. The flow channel may have a circular, rectangular or other shape cross section(s), and may have differing cross-sections or dimensions along its length. A microfluidic flow channel is characterized by cross-sectional dimensions less than 1000 microns. Usually at least one, and preferably all, cross-sectional dimensions are less than 500 microns. Frequently at least one, and preferably all, cross-sectional dimensions are less than 250 microns. Other exemplary flow channel dimensions are discussed herein below (see, e.g., Section VII).

As used herein, a "segment" of a flow channel refers to a section or a specified region of a flow channel. Usually the segment is bounded by specific structural elements of the flow channel, and thus can be defined by reference to the structural elements. Examples of structural elements include valves, changes in channel shape or dimensions (for example a change from a rectangular cross-section to a circular cross section, as when moving from a horizontal channel segment into a vertical fluid communication via), change in direction (for example a "L"-shaped flow channel can be described as having two orthogonally oriented flow channel segments), junctions with other channels, junctions with other elements (e.g., reaction chamber) and the like. Specified flow channel segments can overlap. For example, in a flow channel with four valves designated a, b, c and d, flow channel segments can include a-b, a-c, a-d, b-c, b-d, and c-d. It will be apparent that a flow channel can also be referred to as a channel segment, bounded by the termini of the channel.

As used herein, "linking segment" refers a channel segment that links channel segments in different layers of a device or links a channel segment in one layer to a reaction chamber in a different layer(s). A "fluid communication via" is an example of a linking segment and refers to flow channel segment in an multilayer device that connects fluidic elements in different layers of the device and which is fabricated by drilling, ablating (laser punching), molding or embossing a tunnel through the material from which the device is constructed. Another example of a linking segment is a connecting channel created using a replica molding process such as that described in Anderson et al., U.S. Pat. No. 6,645,432.

As used herein, a "flow path" describes a channel segment or series of channel segments through which a solution can flow and, more specifically, through which solution flows during the operation of a device. For example, during operation of the device illustrated in FIG. 6 a first solution flows from valve V2, through channel segments 250*a, b* and *c*, and into reaction chamber 400. This path can be described as a flow path and, in this example, can be defined as the shortest fluidic path (i.e., shortest path through which a solution can flow) from V2 to reaction chamber 400, passing through valve V1. As discussed below, during operation of the device illustrated in FIG. 6, a second solution flows from channel 230 to reaction chamber 400. This second flow path can be described as the shortest path from channel 230 to reaction chamber 400. This flow path could also be described as the shortest path from channel 230 to reaction chamber 400, passing through valve V3.

As used herein, the terms "layer" and "level" have the standard meaning in the art. The terms are used interchangeably when referring to the position of flow channel segments, control channels, reaction chambers and other elements of a microfluidic device. In some microfluidic devices channels are located in different planes of the device. For example, an on/off elastomeric valve can be fabricated by locating a control channel in one plane so that it crosses the path of a flow channel in an adjacent different plane (see, e.g., Section VII, infra). The term "layer" also reflects the method of fabrication of such devices, in which layers of elastomeric structures may be bonded to each other.

As noted above, the term "blind filling" refers to the process of instilling a solution into a channel or chamber that does not have a functional exit through which an aqueous solution can flow. A chamber or channel may have no functional exit because all potential exit flow channels are blocked by closed or impassable valves, or because there are no exit flow channels (e.g., no channels contiguous with the chamber other then the flow channel though which solution enters the chamber). In the latter situation, a reaction chamber into which the solution is instilled can be called a "dead-end" reaction chamber. A flow channel, or flow channel segment, into which solution is being instilled can be called a "dead-end" or "blind" channel. Blind filling takes advantage of the permeability of the material (e.g., elastomeric materials) defining at least a portion (e.g., at least a portion of one side) of the flow channel or at least a portion (e.g., at least a portion of one wall) of a chamber to gas and not to liquid.

As used herein, the term "check valve" refers to a one-way valve that prevents reverse flow through a microfluidic channel. Exemplary check valves are described below in Example 6. However, check valves used in the devices of the invention are not limited to the particular design illustrated in Example 6.

As used herein, a "bus line" (e.g., reagent bus line or sample bus line) refers to a flow channel or flow path in fluidic communication with a source reservoir (e.g., reagent source reservoir or sample source reservoir) and with slug channels or multiple unit cells. The sample bus line is arranged so that a sample solution can flow from a sample source reservoir to slug channels without flowing though reagent bus lines or reagent input lines. The reagent bus line is arranged, if present, so that a reagent solution can flow from a reagent source reservoir to slug channels without flowing though sample bus lines.

Several terms, examples of which follow, are used for convenience in the discussion and have meaning relative to each other.

The terms "vertical" and "horizontal" are used herein to describe the relationships of device elements, such as channels, and have meaning relative to each other. It is often convenient to fabricate a microfluidic device that is cuboid with one dimension being considerably shorter than the other two dimensions and operate the device so that the short dimension (height) is vertically oriented relative to the earth and the other two dimensions (length and width) are horizontally oriented. In such a design a channel segment in which solution flows in the height dimension may be termed "vertical" and a channel segment in which solution flows in the width and/or length dimension may be termed "horizontal." However the use of these terms does not require a cuboid-shaped device or operation in such an orientation.

The terms "sample solution" and "reagent solution" are used throughout the description to refer to solutions that are mixed using the methods and devices of the invention. Typically a sample solution contains biological material from a particular source (e.g., human, animal, lake, food, etc.) and a reagent solution contains compound used for analysis of a property of the sample. See Section VIII, infra, for examples. However, these terms are used for convenience and the invention is not limited to a narrow interpretation of a "sample" and a "reagent" The invention provides for methods and devices for the thorough mixing of two solutions. Thus, the term sample solution(s) could interchanged with "first solution(s)," "reagent solutions(s)," "analyte solutions," "second solution(s)," etc., and the term reagent solution(s) could interchanged with "first solution(s)," "sample solutions(s)," "analyte solutions," "second solution(s)," etc. For example, a first solution could contain one reactant and the second solution could contain a different reactant that when mixed chemically combine to produce a reaction product.

As used herein, the terms "column" and "row" have their usual meanings and are used in descriptions of unit cell arrays. However, no further function or structure is intended by such references. For example, reference to reagent bus lines that link columns of unit cells and sample bus lines that link rows of unit cells would be equivalent to a reference to reagent bus lines that link rows of unit cells and sample bus lines that link columns of unit cells. Moreover, unless otherwise specified, rows and columns do not require strict alignment. Unit cells in a row, for example, can be staggered or offset from a central line relative to each other. Further, the term "array" is not limited to arrangements of rows and column. For example, unit cells in a unit cell array could be arranged in concentric circles, along radii of the outermost circle.

III. FCS Devices

The invention relates to microfluidic assays and reactions as well as microfluidic devices useful for carrying out the assays and reactions. As noted above, these methods allow precise metering of fluid volumes (and therefore of quantities of assay components) and efficient mixing of the metered volumes. For convenience, devices of the invention may be referred to as "FCS devices."

In one preferred embodiment the FCS device is constructed from elastomeric material(s) using multilayer soft lithography and can be referred to as "elastomeric devices." In this section general familiarity with construction and use of elastomeric microfluidic devices will be assumed. Additional described guidance is provided below in Section VII and references cited therein, as well as other scientific and patent publications readily available to the ordinarily skilled artisan. Elastomeric devices have several advantages over devices made using other technologies. One advantage is the availability of integrated elastomeric valves to regulate movement of solutions. Integrated elastomeric valves are characterized by an elastomeric membrane that may be deflected into (or out of) a flow channel to block or permit movement of solutions through the channel. A second advantage is the ability when using an elastomeric device to use blind filling to load a chamber, channel or channel segment. Notwithstanding these advantages, the methods of the present invention may be carried out using other types of microfluidic devices, including hybrid devices (e.g., comprising elastomeric valves and vents, and nonelastomeric materials to define flow paths and/or chambers), devices using nonelastomeric valves (e.g., valves fabricated using thermoresponsive polymer gels), and devices fabricated wholly from nonelastomeric materials. For convenience, the description below is framed primarily with reference to devices constructed from elastomeric material using multilayer soft lithography.

Reference to the figures will aid in understanding the invention. FIG. 1 illustrates certain general features of a FCS microfluidic device. Other illustrative architectures are shown in FIGS. 4, 5, 6, 7 and 9. As will become clear from the discussion below, the FCS microfluidic devices are not limited to the specific architectures shown in the figures.

Figure 2:
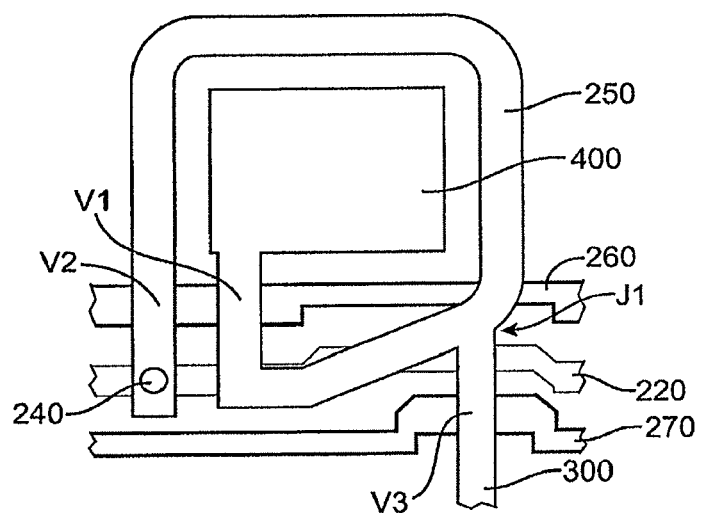
FIG. 2 is an illustration of a single cell of the Exemplar 1 FCS device shown in FIG. 1.

FCS devices comprise an array of interconnected "unit cells" or "cells," which form a basic unit of the device. For illustration, FIG. 1 shows a 4×4 array of such cells, and FIG. 2 illustrates an individual cell.

The FCS device cell is characterized by the following features:

1. A "reaction chamber" (400). The reaction chamber may have a variety of shapes (cubical, cylindrical, etc.). Typically the chamber has a volume in the range 1 nL to 1 uL, more often in the range 4 nL to 200 nL. Usually at least one dimension is at least 50 um, and usually at least 100 um. Particular features of reaction chambers are discussed below in Section VII.

2. A "slug channel" (250). A slug channel is a flow path in fluidic communication with the reaction chamber and with a "sample source reservoir" (discussed below). A slug channel may be a straight or curved channel in a single level of the device (see, e.g., FIG. 2), or may comprise two or more straight or curved channel segments in different levels of the device connected by one or more linking segments such as a fluid communication via (see, e.g., FIG. 6). The slug channel comprises the shortest path from valve V1 to valve V2 (discussed immediately below). It is sometimes useful to refer to the "slug path" which is a term used to encompass the slug channel along with any fluid communication vias (if present) linking the slug channel to the reaction chamber or linking the slug channel to the sample bus line 220, as discussed below. The slug path can be described as the shortest flow path from the sample bus line to the reaction chamber, passing through valve V1 and valve V2.

In some embodiments, the slug channel or slug path is the only fluidic channel connected to the reaction chamber (e.g., solutions can enter the reaction chamber only through the slug path). That is, the reaction chamber is a dead-end reaction chamber.

3. A "first valve" (V1) situated at the proximal end of the slug channel that, when closed, fludically isolates the reaction chamber (400) from the more distal part of the slug channel. As used in this context, the term "proximal" refers to a position in the slug path relative to the reaction chamber. An element located in the slug path at a position that is closer to the reaction chamber than the position of a second element is proximal relative to the second element. The second element is distal relative to the first element.

In some embodiments, the slug path is free of valves in the segment between the first valve (V1) and the reaction chamber. See, e.g., FIGS. 1-7. In some embodiments a check-valve (VCK) is situated between the first valve (V1) and the reaction chamber to prevent reverse flow from the reaction chamber into the slug channel (see, e.g., FIG. 9A).

4. A "second valve" (V2) in the slug channel distal to first valve (V1). In some embodiments, the slug path is free of valves in the segment between the first valve (V1) and the second valve (V2). See, e.g., FIGS. 1-7. In some embodiments a check-valve (VCK) is situated between the first valve (V1) and the second valve (V2) (see FIG. 9B) to prevent reverse flow from the reaction chamber into the slug channel. It is preferable in such a design to place the check valve close to valve V1, to minimize the volume of sample solution in the slug path that is in fluidic communication with the contents of the reaction chamber after the reaction chamber is filled.

In general the first and second valves (V1 and V2) are controlled by the same actuation system and are opened or closed at the same time. For example, in an elastomeric device as illustrated in FIGS. 1-7, valves V1 and V2 are both controlled by control channel 1 (260). In alternative embodiments, however, the second valve (V2) can be a check valve that prevents flow of solution in the fluidic direction opposite the reaction chamber. That is, solution can flow through valve V2 towards the reaction chamber, but not in the opposite direction.

6. A "sample bus line" (220). The slug channel (250) is in fluidic communication with a sample bus line (220) at a junction distal to the second valve (V2). A sample bus line is a flow channel in fluidic communication with a sample source reservoir and with slug paths of a plurality of unit cells (e.g., a row of unit cells). Usually the plurality comprises at least 10 unit cells, often at least 30 unit cells, often at least 40 unit cells, and sometimes at least 96 unit cells. In some embodiments the plurality is exactly 32, 48, or 96 unit cells. Each unit cell is in fluidic communication with a single sample bus line. In some embodiments, unit cells of each row in an array are fluidically connected to a different sample bus line. Thus, in some embodiments the sample bus line constitutes a fill source for the slug paths of a particular row. Using this arrangement the slug path of cells of each row will be loaded with the same sample.

Figure 6:
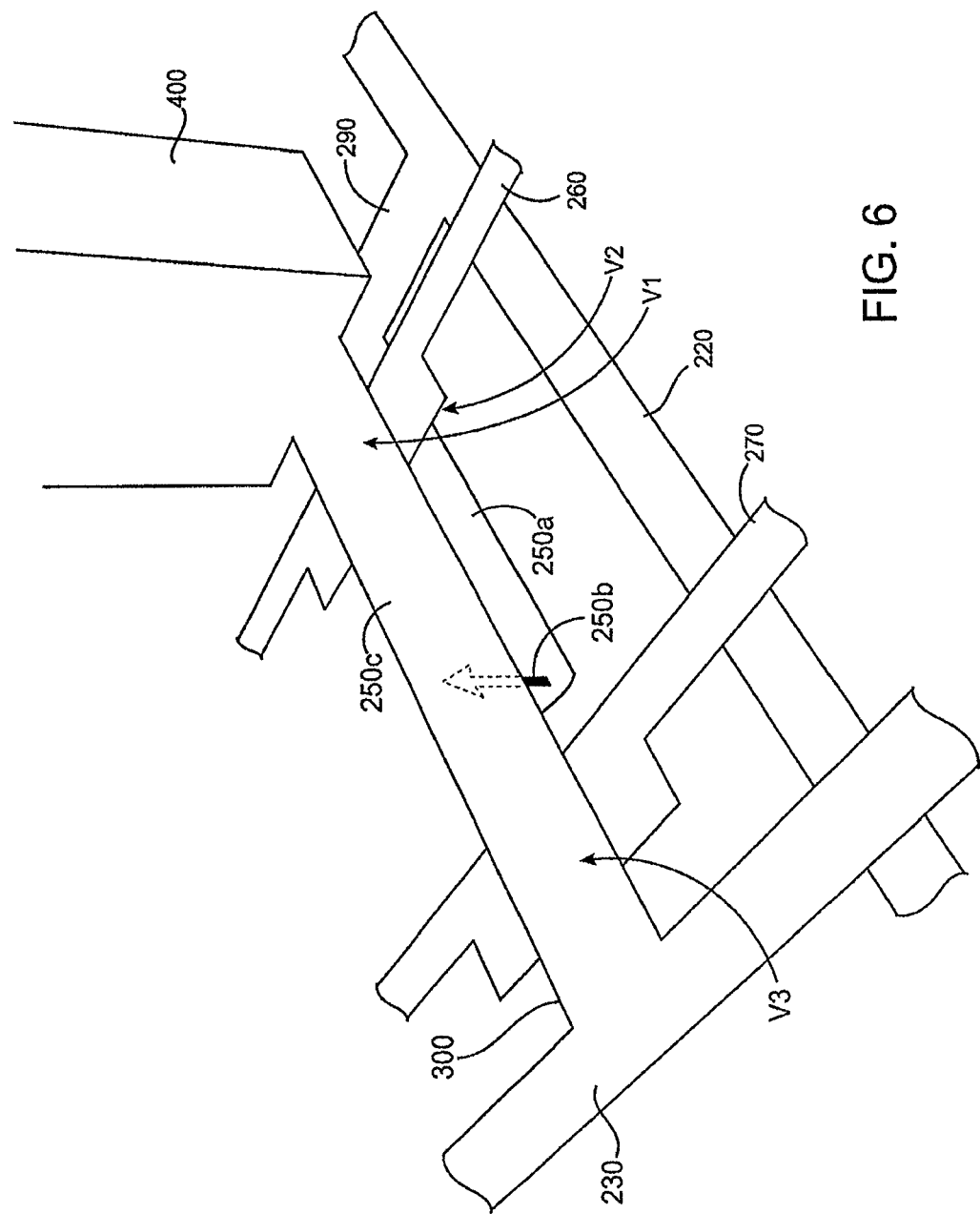
FIG. 6 is an illustration of flow paths and valves of an individual cell of an FCS device (Exemplar 4).

The sample bus line (220) may be connected to the slug channel distal to the second valve by a fluid communication via (240) (see, e.g., FIG. 4) or other linking segment and/or by a "sample input line" (290) (see, e.g., FIG. 6). The sample input line 290 may be short (see, e.g., FIG. 4).

As will be apparent, closure of the second valve (V2) prevents flow from the sample bus line (or sample input line) to the reaction chamber.

7. A "reagent bus line" (230). In certain embodiments the slug channel is in fluidic communication with a reagent bus line. A reagent bus line is a bus line in fluidic communication with a reagent source and with slug channels of a plurality of unit cells (e.g., a column of unit cells). Usually the plurality comprises at least 10 unit cells, often at least 30 unit cells, often at least 40 unit cells, and sometimes at least 96 unit cells. In some embodiments the plurality is exactly 32, 48, or 96 unit cells. Each unit cell is in fluidic communication with a single reagent bus line. In some embodiments, unit cells of each column in an array are fluidically connected to a different reagent bus line.

5. A "reagent input channel" (300). The reagent input channel is in fluidic communication with the slug channel at a junction (J1) that lies between the first valve (V1) and second valve (V2) (i.e., is distal to valve V1 and proximal to valve V2). The reagent input channel is in fluidic communication with a reagent source reservoir. With valves V1 and V2 closed, reagent solution can flow from the reagent source reservoir into the slug channel, filling the portion of the slug channel between valves V1 and V2 with solution.

In some embodiments the reagent input channel is linked to the reagent source reservoir though a reagent bus line (230). See, e.g., FIGS. 4-6. In some embodiments the reagent input channel comprises or consists of a fluid communication via, or other linking segment through which reagent solution flows from the reagent bus line.

In some embodiments, the slug channel is not fluidically connected in the segment between the first valve (V1) and second valve (V2) to any input lines other then the reagent input channel. That is, junction J1 is the only junction in this segment (see, e.g., FIGS. 4-7).

In a different embodiment, as illustrated in FIG. 1, a distinct reagent bus line is not used. Instead, a reagent input channel (300) of each cell is linked to the slug channel of an adjacent cell in the slug channel segment bounded by the first and second valves (V1 and V2). When valves V1 and V2 are closed reagent introduced into one reagent input channel flows to all reagent input channels in a column. In some such embodiments, exactly two reagent input channels (one corresponding to the cell and one corresponding to an adjacent cell) are the only channels in fluidic communication with the slug path in the region of the slug path lying between valves V1 and V2.

It will be clear that other arrangements and architectures, with or without bus lines may be used, so long as a reagent solution from a single reagent source can be delivered to slug channels of a plurality of unit cells in the slug channel segments that lie between valve V1 and valve V2.

7. Each unit cell also comprises a "third valve" (V3) that regulates flow from the reagent input channel to the slug channel of each cell in a column. The position of the third valve will depend on the nature of the reagent input channels and reagent bus line (if present). The third valves may be located in each reagent input line (see FIGS. 1, 5 and 6). Alternatively the third valves may be located in the reagent bus line between cells (see FIG. 7). When the third valves of a column of unit cells are closed, each unit is fluidically isolated from ether cells in the same column, but remain fluidically connected through a sample bus line to other cells in the row. In this embodiment the slug channels of a given column are therefore interconnected when valve 3 is open, but capable of being isolated from each other upon actuation of control channel 2 (270), as is discussed below.

Alternatively, the third valve (V3) may be a check valve that permits fluid flow toward the unit cell reaction chamber, but does not permit flow through the valve in the reverse direction.

In some embodiments, in an FCS device sample flowing from the sample bus line to the reaction chamber passes though exactly two, no more than three (e.g., exactly three), or no more than four (e.g., exactly four) valves. In some embodiments, sample flowing from the sample bus line to the reaction chamber passes though exactly one check valve, or through exactly two check valves. In some embodiments, sample flowing from the sample bus line to the reaction chamber passes though exactly two valves, one of which is a check valve, or exactly three valves, one or two of which is a check valve.

As noted above, a FCS device comprises an array of FCS cells, which may be arranged and linked so that cells of each column can be provided reagent from a common reagent reservoir, and cells of each row can be provided a sample from a common sample reservoir. More generally, in an FCS device array unit cells are arranged in sets. The array may have unit cells arranged in columns and rows. The cells of a particular column (or row) need not be precisely aligned and may, for example, be grouped along concentric circles and radii. Any arrangement that allows analysis cells to be grouped into at least 4 first sets (e.g., rows) with cells of each first set being fluidically linked by a sample bus line (220), and at least 4 second sets (e.g., columns) of unit cells, with cells of each second set being fluidically linked to each other by a flow path that includes the second microfluidic flow path (reagent input line 300) of the cell, where unit cells in the array are not members of more than one first set or more than one second set.

In some embodiment, the FCS device comprises unit cells in columns and rows in which each column is associated with a reagent bus line (230). When valve V3 is open and valves V1 and V2 are closed, solution flowing through the reagent bus line is delivered to the slug path of each cell in the column. Each row is associated with a sample bus line (220). Solution flowing through the sample bus line is delivered to the slug path of each cell in the row and when valves V1 and V2 are sample flows from the sample bus line of a row, through the slug path of cells in the row, and into the reaction chambers of cells of the row. Preferably each column is associated with a unique reagent bus line and each row is associated with a unique sample bus line.

9. Source reservoirs. Source reservoir are containers, wells, chambers and the like that can be loaded with desired sample and reagent solutions. The FCS device may comprise reagent source reservoirs and sample source reservoirs which are part of an integrated carrier device. Alternatively, channels of the device can be fluidically connected to external reservoirs. Generally each sample bus line (220) is in fluidic communication with a sample source reservoir (which is usually a unique reservoir) and each reagent bus line (230) is in fluidic communication with a reagent source reservoir (which is usually a unique reservoir). In FCS devices designed without each reagent bus lines, reagent input channels of each column may be fluidically connected to a reagent source reservoir. The source reservoirs are generally not filled with solutions until they are being prepared for use. However, in some embodiments devices are provided in which at least some reservoirs are prefilled.

10. In a FCS device using integrated elastomeric on-off valves, each cell also comprises a portion of at least one control channel. Typically the device includes a "first control channel" (260), which regulates flow through the first valve V1 and the second valve V2, and a "second control channel" (270), which regulates flow through the third flow channel V3. The valves are opened or closed in response to pneumatic pressure in a control channel, causing deflectable membrane portions to deflect into the flow channels to stop flow of solution through a flow channel and fluidically separate regions of a flow channel from each other (see Section VII below). Usually the control channels are located in a layer of the device that is adjacent to the layer containing the regulated flow channel. In a preferred embodiment each cell comprises portions of two control channels, a first control channel (260) regulating valves V1 and V2, and a second control channel (270) regulating valve V3. In an alternative embodiment valves V1 and V2 can be controlled by two different control channels. In embodiments in which valve V3 is a one-way check valve, it is possible to omit control channel 2.

In one embodiment each first control channel regulates valves V1 and V2 along a row of the array, and each second control channel regulated valves V3 along a column of the array.

An FCS device of the invention usually has at least 16 cells arrayed in at least four rows and at least four columns of cells. Preferably an FCS device comprises more than 16 cells. For example FCS devices have been designed having a 12×8 (96 cells), 12×32 (384), 32×32 array (1024 cells), 48×48 (2304 cells), 96×48 array (4608 cells) and a 96×96 array (9216 cells). In certain embodiments an FCS device may have at least 50 cells, at least 100, at least 500, at least 1000 cells, at least 2000 cells, at least 3000 cells, at least 4000 cells, at least 7500 cells, at least 9000 cells or an even greater number of cells. In one embodiment the cells are contained in a 30 mm×30 mm (900 mm$^2$) area of the nanofluidic chip. In one embodiment the cells are contained in an approximately 31 mm×31 mm area of the nanofluidic chip. In various embodiments the density of cells is at least 1 per mm$^2$, at least 2 per mm$^2$, at least 3 per mm$^2$, at least 4 per mm$^2$, at least 5 per mm$^2$, at least 6 per mm$^2$, at least 7 per mm$^2$, at least 8 per mm$^2$, at least 9 per mm$^2$, at least 10 per mm$^2$, or more than 10 cells per mm$^2$. In various embodiments the density of cells is from 1-20 cells per mm$^2$, or 1-11 cells per mm$^2$.

IV. Operation of FCS Device

In the operation of an FCS device, the slug path is filled (e.g., by blind filling) with a reagent solution. The reagent is contained in a section of the slug path bounded by valves V1 and V2. A sample solution is introduced through the sample bus line (and optionally through a sample input channel), typically by blind filling, into the section of the slug path distal to valve V2. Valves V1 and V2 is then opened and the sample solution is forced through the slug path such that it pushes the reagent solution through the slug path into the reaction chamber. Typically the reaction chamber is filled by blind filling. As noted above, the volume of reaction chamber exceeds the volume of reagent solution forced into the chamber, with the result that both reagent and sample solutions are introduced into the chamber. It has been discovered by the inventors that this process results in highly efficient mixing of the reagent and sample solutions. It has also been determined that assays carried out using the FCS device system resulted in surprisingly superior results compared to use of prior art devices under the same conditions (see, e.g., Example 7).

Efficiency in mixing for two solutions can be measured. For a first solution containing solute A and a second solution containing solute B, can be measured as the amount of B dispersed in the first solution at a given period of time. For miscible solutions, the mixing will be 100% efficient over a long enough period of time. Efficiency can be measured by art known methods. In one assay, mixing efficiency is assayed using TaqMan Gene Expression Assays as an indicator. The assay includes a FAM™ dye labeled TaqMan® MGB (minor groove binder) probe. The probe has been generally used as a quantification reporter in real time PCR. Fluorescence intensity in a microfluidic chamber corresponds to the presence of the probe. In determining mixing efficiency, two solutions are used. A first solution does not contain probe. A second solution contains 2 µM probe. The solutions are loaded into a microfluidic device and chamber loading initiated. Upon completion of loading the chamber(s) with the solutions, a fluorescent intensity image is taken by a high resolution fluorescence camera. That image is compared with a standard fluorescence image. The standard image is obtained by mixing the first solution with the second solution before loading the microfluidic system and then loading the mixture into the microfluidic device. The mixing efficiency is defined as the fluorescence intensity of the on-device mixed solutions divided by the intensity of the standard image intensity. Using the devices and methods of the present invention, mixing occurs more rapidly than prior art devices. In one embodiment, twenty five percent (25%) efficiency is achieved in 30 minutes or less, often less than 20 minutes, often less than 10 minutes, often less than 5 minutes, and sometimes less than 1 minute. In one embodiment, fifty percent (50%) efficiency is achieved in 30 minutes or less, often less than 20 minutes, often less than 10 minutes, often less than 5 minutes, and sometimes less than 1 minute. In one embodiment, seventy five percent (75%) efficiency is achieved in 30 minutes or less, often less than 20 minutes, often less than 10 minutes, often less than 5 minutes, and sometimes less than 1 minute.

Without intending to be bound by a particular mechanism, it is believed the superior results are a consequence of improved and highly efficient mixing of solutions achieved by the devices disclosed herein. Indeed, the mixing of the solutions is typically greater that 25% efficient, preferably greater than 35% efficient, more preferably greater than 50% efficient, more preferably greater that 65% efficient, more preferably greater than 75% efficient, more preferably greater than 85% efficient, more preferably greater than 90% efficient, more preferably greater than 95% efficient, more preferably greater that 99% efficient, and more preferably about 100% efficient.

The volume of reagent displaced into the reaction chamber is determined primarily by the dimensions of the slug path and position of valves V1 and V2. In general the volume of reagent introduced into the reaction chamber corresponds to the volume of the slug path lying between valves V1 and V2, referred to as the "slug volume" (SV). The actual volume of reagent introduced into the reaction chamber can be varied upward, if desired, based on design and process conditions.

Figure 4:
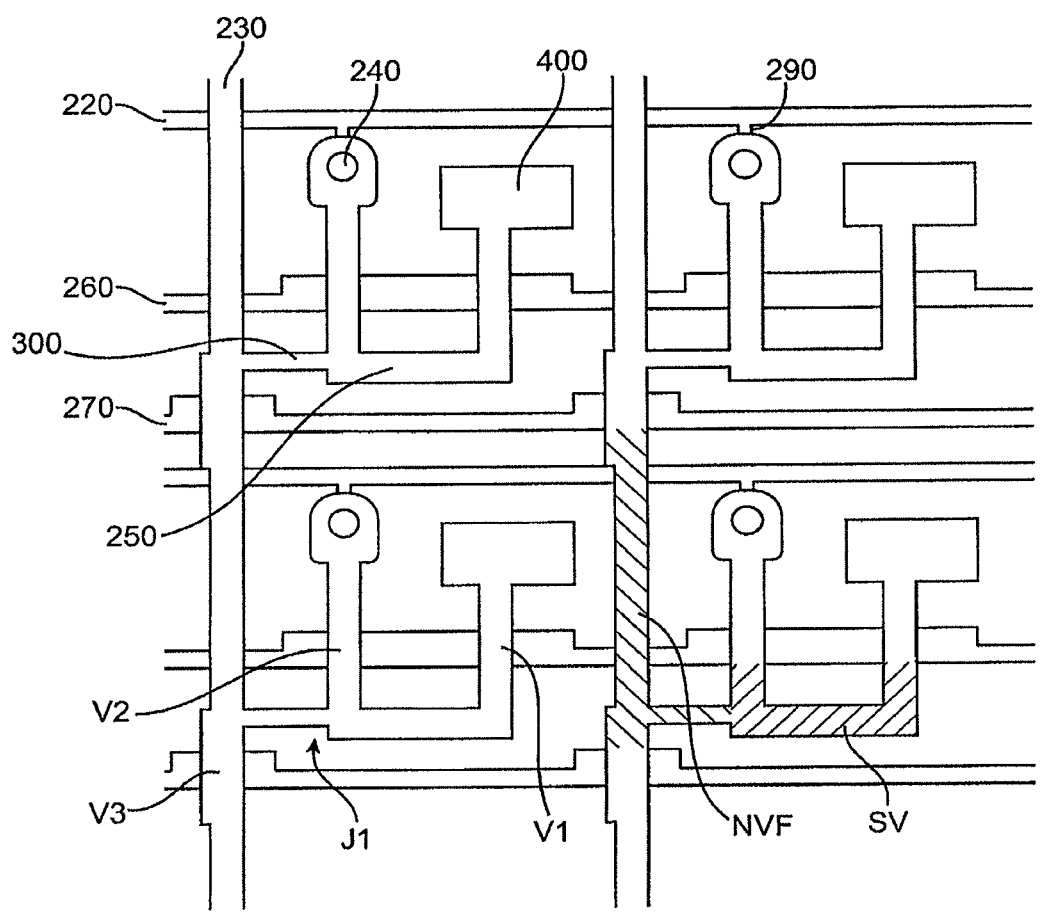
FIG. 4 is an illustration of flow paths and valves of a FCS device (Exemplar 2) showing a 2×2 array of cells.

The careful reader will have noted that the volume defined in each cell when valves V1, V2 and V3 of an array are closed exceeds the slug volume. This is illustrated in FIG. 4 in which the slug volume (SV) and the "non-flowing volume" (NFV), which is fluidically connected to the slug volume, are identified by cross-hatching. (All figures are for illustration and are not to scale.) If during the operation of the device the sample solution was forced through the slug channel relatively slowly, a portion of the reagent solution in the NFV would diffuse into the reagent or sample solution flowing past, increasing the amount of reagent introduced into the reaction chamber. In practice, because flow through microfluidic channels is primarily laminar the amount of solution that diffuses from the NW into the flow path will usually be minor under conditions of normal use. Channel sizes, aspect ratios, and orientations, along with the speed of flow of reagent and sample solutions through the slug path, can be adjusted to minimize, or if desired increase, the amount of NFV content that enters the reaction chamber.

Figure 7A:
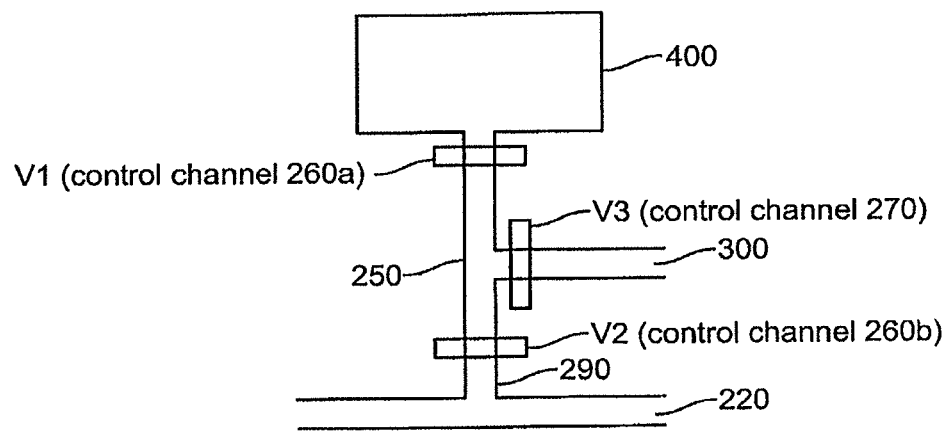
FIG. 7A-C illustrates injection of multiple reagent slugs in an FCS device (Exemplar 5).
Figure 7B:
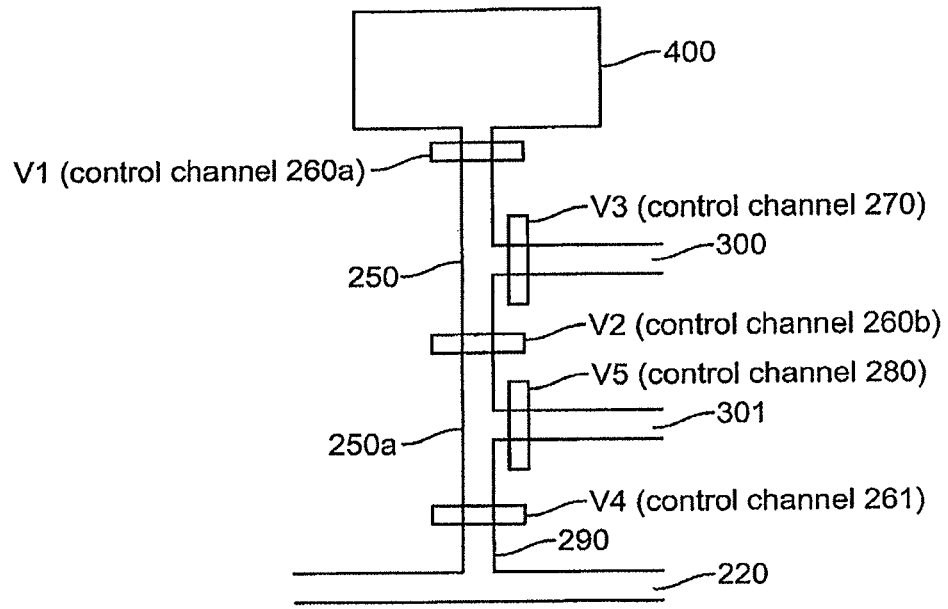
Figure 7C:
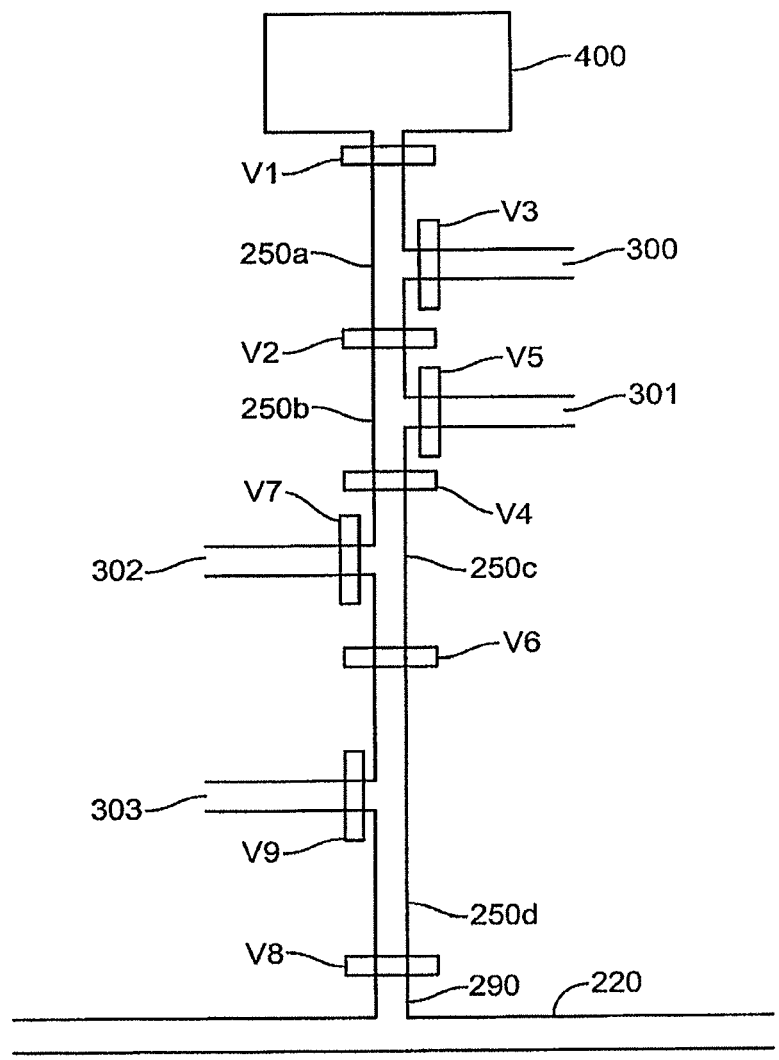

In some FCS device, illustrated in FIGS. 7B and 7C, more than one reagent solution may be introduced along with sample into the reaction chamber. See Section VI(F) below.

The operation of an exemplary FCS device is illustrated in FIG. 3A-3H. The illustration in FIG. 3 is somewhat idealized in that it shows all of the reagent solution entering the reaction chamber before any of the sample solution enters. In practice, due to sheath flow, a bullet-shaped flow velocity profile will occur in the slug channel segment. Therefore, to achieve complete transfer of the reagent solution from the slug path into the reaction chamber, it is desirable that the reaction chamber volume be at least 2 times that of the slug volume (volume of salutation 1 introduced into the chamber). Preferably the reaction chamber volume is at least 3 times the slug volume, more preferably at least 4 times, often at least 5 times, at least 6 times, at least 7 times, at least 8 times, or at least 9 times the slug volume.

Figure 3A:
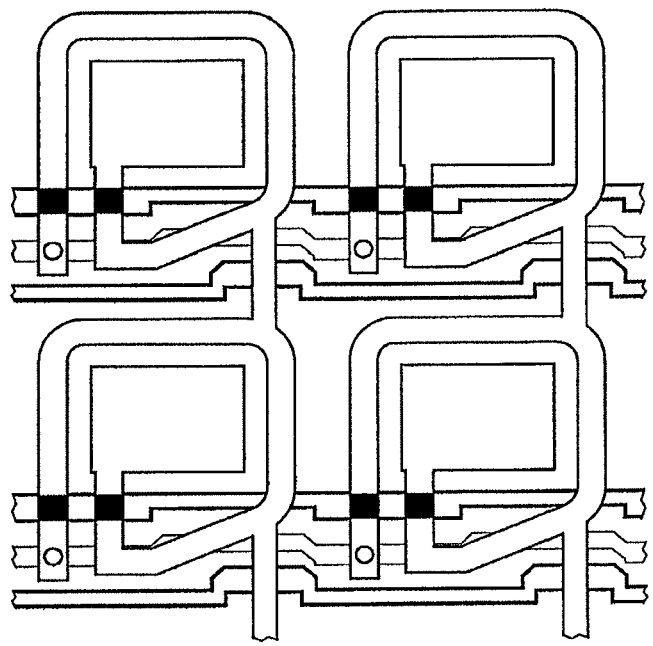
FIGS. 3A-3H illustrate filling and use of the Exemplar 1 FCS device.

FIG. 3A: Control channel 1 (260) is pressurized to close the valves that fluidically isolate the ends of the slug channel segment (valves V1 and V2)

Figure 3B:
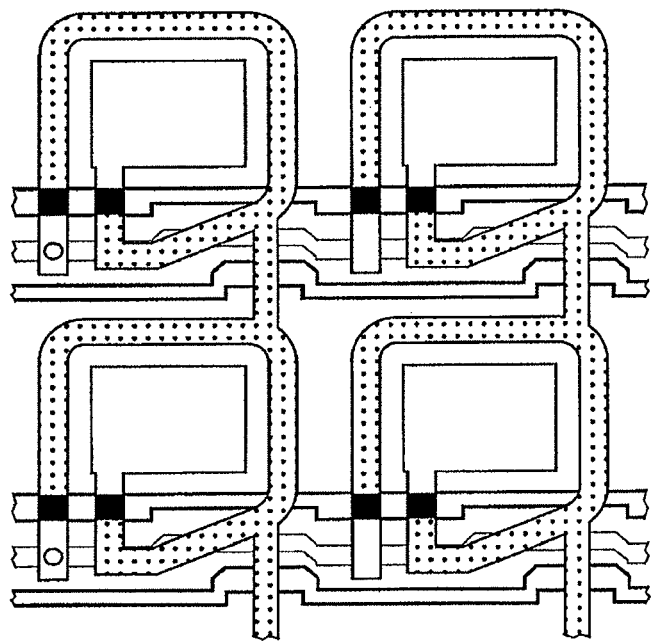

FIG. 3B: A reagent solution (solid dots) is introduced under pressure through the reagent input channels (300), through open valve 3 (V3), and the slug channels are blind-filled.

Figure 3C:
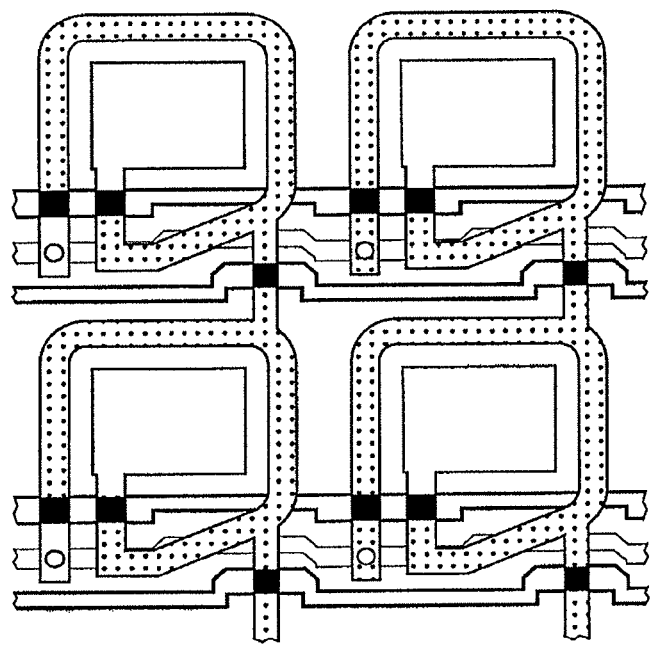

FIG. 3C: Following the filling of the slug channels, control channel 2 (270) is pressurized to actuate the valves (V3) that close off the reagent input channels (300) and thereby isolate the individual slug channels from the other slug channels in the columns. In arrays in which there is a reagent bus line valve V3 can be located in the bus line between cells, or in the reagent input channel associated with each cell.

Figure 3D:
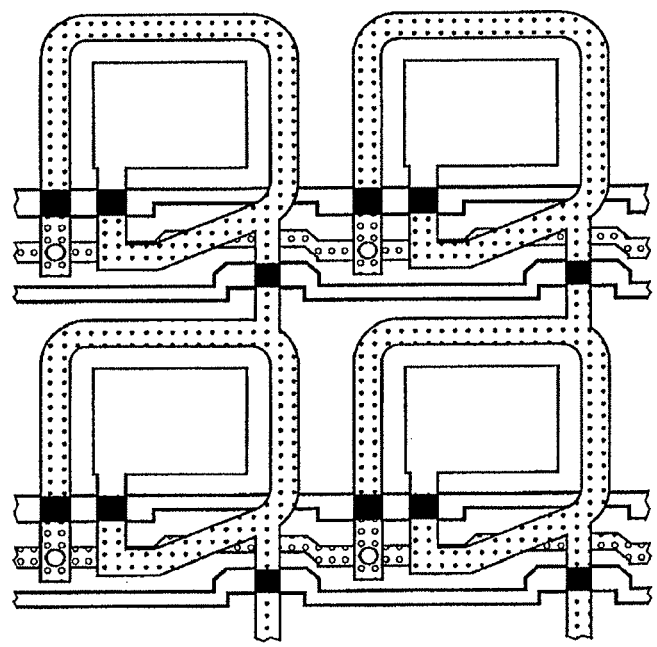

FIG. 3D: Following the blind filling of the slug channels and their isolation, a sample solution (open dots) is introduced under pressure into each sample bus line (220). Although for clarity FIG. 3 shows sequential addition of reagent and sample, it is also possible, and often preferred, to inject reagent and sample at the same time, with valves V1 and V2 closed and valve V3 open.

Figure 3E:
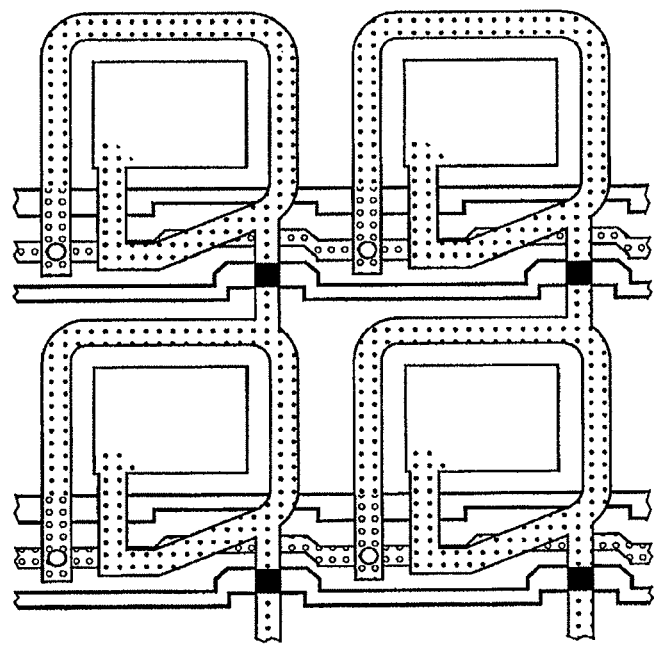
Figure 3F:
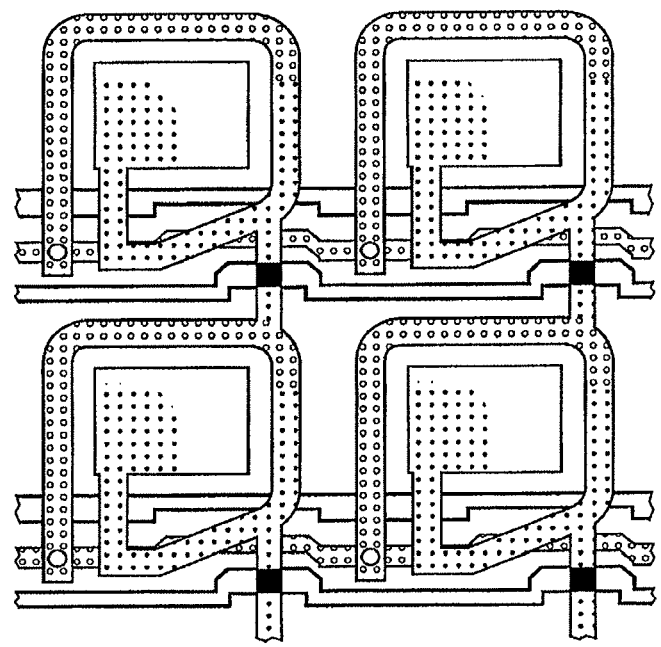

FIGS. 3E and 3F: The control channels 1 (260) are then depressurized to open the interface valves (V1 and V2) that were previously closed to isolate the ends of the slug channels. The sample solution enters the slug channel at the first end and pushes the reagent into the reaction chamber. The conditions of the sample injection will vary. In some embodiments the sample solution is injected under pressure in the range 8-15 PSI.

Figure 3G:
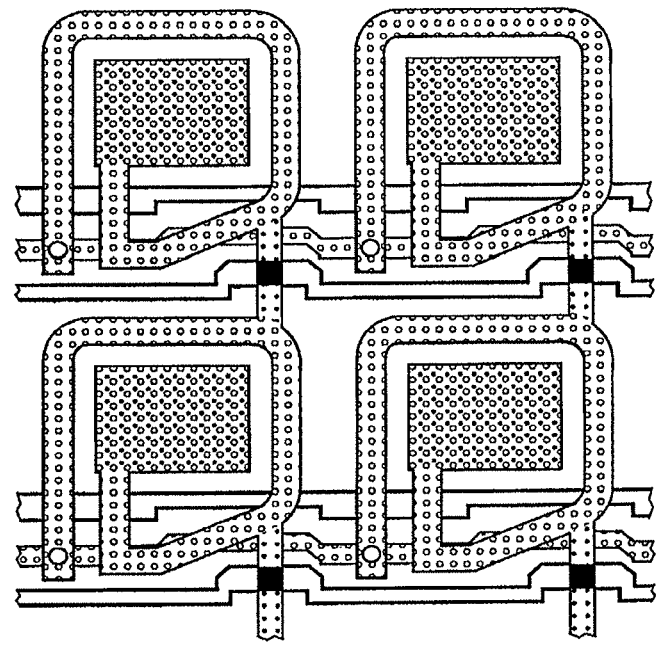

FIG. 3G: This results in a highly mixed, loaded reaction chamber (400) containing the 5 nL of reagent solution and 45 nL of sample solution (50 nL total reaction chamber volume).

Figure 3H:
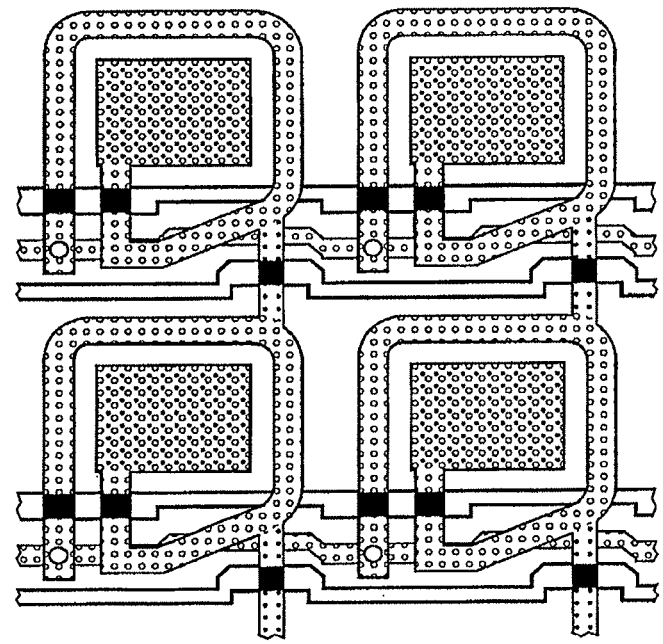

FIG. 3H: Finally, in this demonstration, control channel 1 is pressurized which results in the closure of the interface valves.

Although all rows in the reaction array and, accordingly, all sample input channels, are filled with the same sample solution, there is no interconnection between the sample input channels of the individual rows and different samples can be introduced into the individual rows. In a 32×32 matrix having the configuration show in FIG. 1 (Exemplar 1) 32 separate samples can be simultaneously mixed and loaded into reaction chambers with 32 separate reagents for 1024 individual experiments.

Although generally discussed in term of mixing of solutions, more generally the invention provides a method of combining two solutions in a microfluidic chamber. For example, the invention provides a method for combining two solutions in a microfluidic reaction chamber by introducing a predetermined volume of a first solution into a reaction chamber, introducing a predetermined volume of a second solution into a reaction chamber, and fluidically isolating the reaction chamber. Advantageously, the FCS methods and devices result in introduction of essentially all of the first solution (and a defined volume of the second solution) into a chamber. Following introduction into the chamber rapid mixing may occur due to an increased interface, as discussed above, and because, for a solute in solution 1 the average diffusional path length to solution 2 is shorter than in prior art microfluidic devices (and, equivalently, for a solute in solution 2 the average diffusional path length to solution 1 is shorter than in prior art microfluidic devices). Thus, predetermined amounts of two solutions can be introduced into a chamber having chamber volume specified herein in Section VII. The chamber can then be fluidically isolated.

Moreover, using methods described herein (see, e.g., FCS Device Exemplar 5) more than two solutions can be introduced into a chamber by sequentially introducing predetermined volumes of N different solutions where N is at least 2. Usually N is from 2 to 10, usually 2-5, such as 2, 3, 4 or 5. The combined total volume of the solutions is about equal to the fluid capacity of the reaction chamber.

V. Systems

The FCS device described herein may be used in conjunction with additional elements including components external to the device. Examples of external components include external sensors, external chromatography columns, actuators (e.g., pumps or syringes), control systems for actuating valves, data storage systems, reagent storage units (reservoirs), detection and analysis devices (e.g., a mass spectrophotometer), programmable readers, controllers, and other components known in the art. See, e.g., co-pending and commonly owned U.S. Patent Publication Nos. 2006/0006067, 2007/0074972; 2005/0214173; and 2005/0118073 each of which is incorporated herein for all purposes.

The microfluidic devices utilized in embodiments of the present invention may be further integrated into the carrier devices such as, for example, those described in co-pending and commonly owned U.S. Patent Application No. US2005/0214173A1, incorporated herein for all purposes. These carriers provide on-board continuous fluid pressure to maintain valve closure away from a source of fluid pressure, e.g., house air pressure. Further provided is an automated system for charging and actuating the valves of the present invention as described therein. An another preferred embodiment, the automated system for charging accumulators and actuating valves employs a device having a platen that mates against one or more surfaces of the microfluidic device, wherein the platen has at least two or more ports in fluid communication with a controlled vacuum or pressure source, and may include mechanical portions for manipulating portions of the microfluidic device, for example, but not limited to, check valves.

Another device utilized in embodiments of the present invention provides a carrier used as a substrate for stabilizing an elastomeric block. Preferably the carrier has one or more of the following features; a well or reservoir in fluid communication with the elastomeric block through at least one channel formed in or with the carrier; an accumulator in fluid communication with the elastomeric block through at least one channel formed in or with the carrier; and, a fluid port in fluid communication with the elastomeric block, wherein the fluid port is preferably accessible to an automated source of vacuum or pressure, such as the automated system described above, wherein the automated source further comprises a platen having a port that mates with the fluid port to form an isolated fluid connection between the automated system for applying fluid pressure or vacuum to the elastomeric block. In devices utilized in certain embodiments, the automated source can also make fluid communication with one or more accumulators associated with the carrier for Charging and discharging pressure maintained in an accumulator. In certain embodiments, the carrier may further comprise a region located in an area of the carrier that contacts the microfluidic device, wherein the region is made from a material different from another portion of the carrier, the material of the region being selected for improved thermal conduction and distribution properties that are different from the other portion of the carrier. Preferred materials for improved thermal conduction and distribution include, but are not limited to silicon, preferably silicon that is highly polished, such as the type of silicon available in the semiconductor field as a polished wafer or a portion cut from the wafer, e.g., chip.

Embodiments of the present invention utilize a thermal source, for example, but not limited to a PCR thermocycler, which may have been modified from its original manufactured state. Generally the thermal source has a thermally regulated portion that can mate with a portion of the carrier, preferably the thermal conduction and distribution portion of the carrier, for providing thermal control to the elastomeric block through the thermal conduction and distribution portion of the carrier. In a preferred embodiment, thermal contact is improved by applying a source of vacuum to a one or more channels formed within the thermally regulated portion of the thermal source, wherein the channels are formed to contact a surface of the thermal conduction and distribution portion of the carrier to apply suction to and maintain the position of the thermal conduction and distribution portion of the carrier. In a preferred embodiment, the thermal conduction and distribution portion of the carrier is not in physical contact with the remainder of the carrier, but is associated with the remainder of the carrier and the elastomeric block by affixing the thermal conduction and distribution portion to the elastomeric block only and leaving a gap surrounding the edges of the thermal conduction and distribution portion to reduce parasitic thermal effects caused by the carrier. It should be understood that in many aspects of the invention described herein, the preferred elastomeric block could be replaced with any of the known microfluidic devices in the art not described herein, for example devices produced such as the GeneChip® by Affymetrix® of Santa Clara, Calif., USA, or by Caliper of Mountain View, Calif, USA. U.S. patents issued to Soane, Parce, Fodor, Wilding, Ekstrom, Quake, or Unger, describe microfluidic or mesoscale fluidic devices that can be configured to utilize the carry slug mixing methods or devices of the current invention. A unit cell of the invention can be used as a mixing module in a microfluidic device containing other elements. In such an embodiment the reagent input channel 300 and/or sample input channel 290 may be linked to a solution reservoir or, alternatively, to a channel that is an output of a different on-chip element such as a column, chamber, or channel. Similarly, the reaction chamber may include an exit channel (500) that fluidically connected to a different on-chip element such as a column, chamber, or channel. Examples include microfluidic protein crystallization devices, bioprocessing devices, including cell-based assay devices, microfluidic immunoassay devices, combinatorial synthesis systems, nucleic acid sample preparation devices, electrophoretic analytical devices, microfluidic microarray devices, microfluidic devices incorporating electronic or optical sensors, and nucleic acid and protein sequencing devices.

VI. FCS Device Exemplars

A. FCS Device Exemplar 1

FIG. 1 is a diagram illustrating a portion of the array of an FCS device. This design has been used to fabricate a 32-column by 32-row FCS array having a footprint less than 10 cm$^2$ and a height of 4 mm.

In operation of the Exemplar 1 ("E1") FCS device, control channel 1 (260) is pressurized to close valves V1 and V2. Reagent solution is flowed through reagent input channels (300) and thereby introduced into the slug path (250) of the cell. Because reagent input channels (300) are fluidically linked to the slug channel of an adjacent cell in a column, infusion of reagent solution through the reagent input channel of one cell fills all cells in the column. When the fill step is completed, valve V3 can be closed. Concurrent with, prior to, or subsequent to the loading of the reagent solution, sample solution is loaded via sample bus line (220), through fluid communication via, and into the distal portion of the slug path, and maintained under pressure against valve V2. Valves V2 and V3 are then opened and sample solution, fed by the sample bus line (220) flows through the via into the slug path to reaction chamber 400. As the sample solution moves through the slug path it pushes (displaces) the reagent solution out of the slug path and into the reaction chamber 400 where it is mixed with the sample solution initiating the reaction of interest.

In the FCS device illustrated in FIGS. 1 and 2, the first elastomeric layer contains elements 220, 260, and 270 and the second elastomeric layer contains elements 250, 300, and 400.

B. FCS Device Exemplar 2

FIG. 4 is a diagram illustrating a portion of the array of an FCS device. This design has been used to fabricate a 48-column by 48-row FCS array having a footprint less than 10 cm$^2$ and a height of 4 mm.

In operation of the Exemplar 2 ("E2") FCS device, control channel 1 (260) is pressurized to close valves V1 and V2. Reagent solution is flowed through the reagent bus line (230) and reagent input channels (300) and thereby introduced into the slug path (250) of the cell. When the fill step is completed, valve V3 can be closed. Concurrent with, prior to, or subsequent to the loading of the reagent solution, sample solution is loaded via sample bus line (220), through fluid communication via. 240, and into the distal portion of the slug path, and maintained under pressure against valve V2. Valves V2 and V3 are then opened and sample solution, fed by the sample bus line (220) flows through fluid communication via 240 through the slug path to reaction chamber 400. As the sample solution moves through the slug path it pushes (displaces) the reagent solution out of the slug path and into the reaction chamber 400 where it is mixed with the sample solution initiating the reaction of interest.

In the FCS device illustrated in FIG. 4, the first elastomeric layer contains elements 220, 260, and 270 and the second elastomeric layer contains elements 230, 250, 300, and 400.

C. FCS Device Exemplar 3

Figure 5:
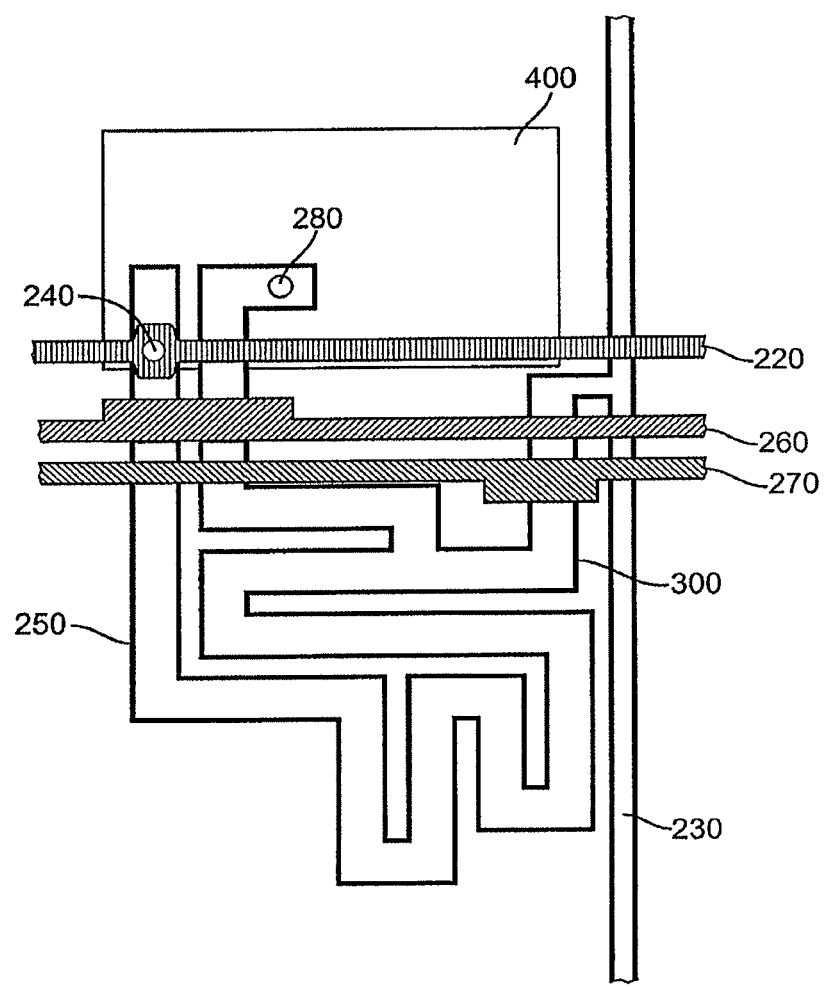
FIG. 5 is an illustration of an individual cell of a FCS device (Exemplar 3).

FIG. 5 is a diagram illustrating a cell of an array of an FCS device. In the operation of the Exemplar 3 ("E3") FCS device, control channel 1 (260) is pressurized to close push-down valves V1 and V2. Reagent solution is flowed through a reagent bus line (230), through a valved reagent input line (300), and introduced into the slug path (250) of the cell. When the fill step is completed, valve V3 can be closed. Concurrent with, prior to, or subsequent to the loading of the reagent solution, sample solution is loaded via sample bus line (220), through fluid communication via 240, and into the distal portion of the slug path, and maintained under pressure against valve V2. Valves V2 and V3 are then opened and sample solution, fed by the sample bus line (220) flows through the slug path pushing (displacing) the reagent solution through fluid communication via 280 into reaction chamber 400, with a portion of the sample solution also entering the reagent chamber, whereupon the reagent solution and the sample solution are mixed.

In the FCS device illustrated in FIG. 5, an upper elastomeric layer contains elements 220, 260, and 270, a middle elastomeric layer contains elements 230, 250 and 300, and a lower elastomeric layer contains chamber 400.

D. FCS Device Exemplar 4

FIG. 6 is a diagram illustrating selected elements of one cell of an array of an FCS device (Exemplar 4, "E4"). In the E4 FCS device the slug path has channel segments in two different layers of a multilayer elastomeric device. As illustrated in the figure, the slug path comprises a first channel segment (250*a*) in one layer of the device, a second channel segment (250*c*) in a third layer of the device, and a fluid communication via (250*b*) linking the channel segments. For clarity the fluid communication via is represented in the figure by an arrow. This design has been used to fabricate a 48-column by 96-row PCS array having a footprint less than 10 cm$^2$ and a height of 4 mm.

In operation of the Exemplar 4 FCS device, control channel 1 (260) is pressurized to close valves V1 and V2. In the embodiment shown in this figure, the valves actuated by control channel 260 are "push-up/push-down valve" is used to simultaneously closes valve V1 in channel segment 260*c* and valve V2 in 260*a*. A push-up/push-down valve can be created, for example and not limitation, in an elastomeric device by sandwiching a control line between two fluid channels as illustrated in FIG. 8. Layer C comprises a control line (in this case, control line 260), while layers B and D are fluidic channels (in this case channel segment 250*a* and 250*c*). As can be seen in the figure, the bottom surface of the fluid channel in layer D is defined by a thin upper membrane in layer C. This thin upper membrane comprises a push-up valve when the control line is pressurized, since the membrane would deflect upwards sealing off the fluid channel in layer D. Similarly, the upper membrane of the fluid channel in layer B defines the lower surface of the control channel in layer C. When the control channel is pressurized, this thin membrane deflects downwards creating a push-down valve. The push-up/push-down configuration allows valves to be stacked on top of each other. This allows for designs with very high feature density.

With valves V1 and V2 closed, reagent solution is flowed through reagent bus line 230 into reagent input channel 300 and introduced into the slug path (250*abc*). Slug path 250 comprises two slug channel segments (250*a*, lower, and 250*c*, upper) which are linked by a fluid communication via (250*b*).

In some embodiments the region of slug channel segment 250c that lies directly over fluid communication via (250b) is enlarged to increase the slug volume. For clarity, this enlargement is not illustrated in FIG. 6. As a consequence of these steps reagent solution fills the slug path 250abc. Concurrent with this step, sample solution is loaded via sample bus line (220) into the sample input channel (290) and maintained under pressure against valve V2. Valve V3 is then closed by pressurizing control channel 270.

Control channel 1 (260) is then depressurized to open valves V1 and V2. Sample solution, fed by the sample bus line (220) then flows through the valve into slug channel segment 250a, through fluid communication via 250b, into slug channel segment 250c, and into reaction chamber 400. As the sample solution moves through the slug path it pushes (displaces) the reagent solution out of the slug path and into the reaction chamber 400 where it is mixed with the sample solution. Following the push, valve V2 is closed. Most often, valves V1 and V2 are both closed. In some embodiments a reaction is initiated by the mixing the reagent and sample solutions. In some embodiments the reaction is initiated by another stimulus, most typically a change in temperature of the reaction chamber. An example is the application of heat to initiate a nucleic acid amplification reaction.

In the FCS device illustrated in FIG. 6, the first elastomeric layer contains elements 220, 290, and 250c; the second elastomeric layer contains elements 260, 270 and 250b (Which traverses the second layer); and the third layer contains elements 230, 300, 250c and 400. As shown, reaction chamber 400 spans several layers to provide the desired volume.

FCS devices having slug channel segments on an even greater number of layers are contemplated. For example, a high density array may have slug channel segments on four or more levels (e.g., four horizontal channels linked by three fluid communication vias). In such a device fluid can flow through the slug flow path in multiple horizontal planes and multiple vertical planes, and in both vertical directions (up and down) during operation of the device.

F. FCS Device Exemplar 5

FIG. 7B-C illustrate a FCS unit design that provides for mixing of multiple metered solutions. FIG. 7A shows selected elements of unit cells previously discussed (control channels and reagent bus line are not shown). FIG. 7B shows a design for mixing two reagent solutions ("reagent 1" and "reagent 2") and a sample solution. As discussed supra in Section II, the designations "sample" and "reagent" are for convenience and do not necessarily describe the nature of the solutions. In FIG. 7B, slug channel 250 has two segments, 250a and 250b defined and bounded by valves V1 and V2, and V2 and V4, respectively. With valves V3 and V5 open, reagent 1 is instilled into segment 250a and reagent 2 is instilled into segment 250b. The flow channel segments can be filled simultaneously or in any order. Sample solution is flowed through sample bus line 200 into segment 290 and maintained under pressure against valve V4. Valves V3 and V5 are closed and valves V1, V2 and V4 are opened. Sample solution under pressure flows through slug path 250 pushing reagent solutions 1 and 2 into the reaction chamber 400. FIG. 7C illustrates an analogous design in which up to 5 solutions may be combined. See Example 4, infra. The fluid capacity of reaction chamber 400 should exceed the combined fluid volumes of the reagent solutions pushed into the chamber.

G. FCS Devices with Check Valves

In some embodiments the unit cells of a FCS device comprises one or more microfluidic check valves. A microfluidic check valve is a valve that allows solution to flow in only one direction through the valve. A variety of check valves are known. See, e.g., Adams et al., 2005, *J. Micromech. Microeng.* 15:1517-21 and references 6-12 therein. In one embodiment the check valve has a small dead volume (e.g., less than 100 nL) and comprises an outlet chamber in fluidic communication with an outlet channel, an inlet chamber in fluidic communication with an inlet channel, and a deflectable membrane between the outlet chamber and the inlet chamber, the membrane having a fluidic channel that places the inlet chamber in fluidic communication with the outlet chamber. An exemplary check valve is described in copending application PCT/US07/80489 (filed Oct. 4, 2007) the entire content of which is incorporated by reference. An exemplary check valve is described below in Example 6 and illustrated in FIGS. 10 and 11.

Figure 9A:
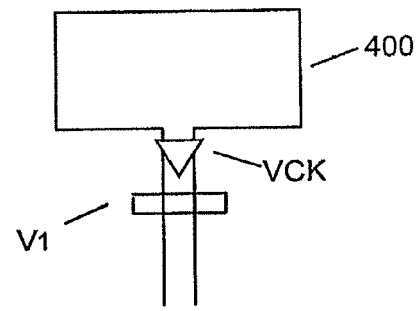
FIGS. 9A and 9B illustrate an FCS device including a check valve.
Figure 9B:
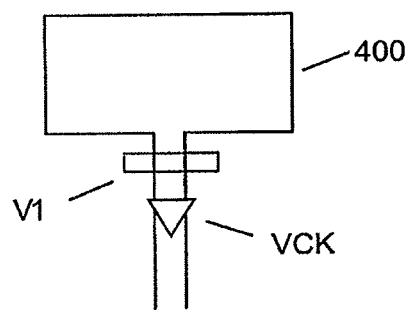

In certain embodiments the check valve is located in the analysis unit in the slug path between valve V1 and the reaction chamber 400, as is illustrated in FIG. 9A. Inclusion of the check valve proximal to the reaction chamber provides certain advantages. For example, in operation of an FCS device, after reagent and sample solutions are delivered to the reaction chamber, the chamber is often isolated, e.g., by closing valve V1, so that the reaction is contained in the reaction chamber. By using a check valve the reaction chamber contents may be effectively contained in the chamber without the necessity of closing valve V1 and/or without the need to maintain valve V1 in the closed state for the duration of the reaction and/or duration of any analysis steps. This is especially useful when the FCS device is physically moved after the reaction chamber is filled (e.g., moved to a thermocycler or reader). In an alternative embodiment, a check valve can be placed distal to valve 1 as shown in FIG. 9B.

H. FCS Devices Having Reaction Chambers with Exit Channels

Figure 9C:
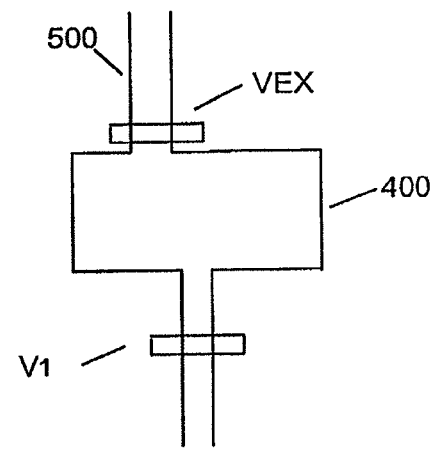
FIG. 9C illustrates a FCS device in which the chamber 400 has a valved exit channel 500.

As illustrated in FIG. 9C in some embodiments the reaction chamber be in direct fluidic communication with one or more than one flow channels (e.g., flow channel 500) in addition to the slug path. Such additional flow channels are valved (e.g., exit valve VEX).

VII. Characteristics and Fabrication of FCS Devices

FCS devices of the invention can be constructed out of any material or combination of materials that can be fabricated to have microfluidic channels and chambers, and valves that regulate flow through channels and into chambers. Materials from which a device can be fabricated include, without limitation, elastomers, silicon, glass, metal, polymer, ceramic, inorganic materials, and/or combinations of these materials.

The methods used in fabrication of a FCS device will vary with the materials used, and include soft lithography methods, microassembly, bulk micromachining methods, surface micro-machining methods, standard lithographic methods, wet etching, reactive ion etching, plasma etching, stereolithography and laser chemical three-dimensional writing methods, modular assembly methods, replica molding methods, injection molding methods, hot molding methods, laser ablation methods, combinations of methods, and other methods known in the art or developed in the future. A variety of exemplary fabrication methods are described in Fiorini and Chiu, 2005, "Disposable microfluidic devices: fabrication, function, and application" *Biotechniques* 38:429-46; Beebe et al., 2000, "microfluidic tectonics: a comprehensive construction platform for micro systems." *Proc. Natl. Acad. Sci. USA* 97:13488-13493; Rossier et al.; 2002, "Plasma etched polymer microelectrochemical systems" *Lab Chip* 2:145-150; Becker et al., 2002, "Polymer microfluidic devices" *Talanta* 56:267-287; Becker et al., 2000, "Polymer microfabrication methods for microfluidic analytical applications" *Electrophoresis* 21:12-26; U.S. Pat. No. 6,767,706

B2, e.g., Section 6.8 "Microfabrication of a Silicon Device"; Terry et al., 1979, A Gas Chromatography Air Analyzer Fabricated on a Silicon Wafer, *IEEE Trans. on Electron Devices*, v. ED-26, pp. 1880-1886; Berg et al., 1994, *Micro Total Analysis Systems*, New York, Kluwer; Webster et al., 1996, *Monolithic Capillary Gel Electrophoresis Stage with On-Chip Detector* in International Conference On Micro Electromechanical Systems, *MEMS 96*, pp. 491496; and Mastrangelo et al, 1989, *Vacuum-Sealed Silicon Micromachined Incandescent Light Source*, in Intl. Electron Devices Meeting, *IDEM 89*, pp. 503-506.

A) Elastomeric Fabrication

In preferred embodiments, the device is fabricated using elastomeric materials. Fabrication methods using elastomeric materials and methods for design of devices and their components have been described in detail in the scientific can patent literature. See, e.g., Unger et al., 2000, *Science* 288: 113-16; U.S. Pat. No. 6,960,437 (Nucleic acid amplification utilizing microfluidic devices); U.S. Pat. No. 6,899,137 (Microfabricated elastomeric valve and pump systems); U.S. Pat. No. 6,767,706 (integrated active flux microfluidic devices and methods); U.S. Pat. No. 6,752,922 (Microfluidic chromatography); U.S. Pat. No. 6,408,878 (Microfabricated elastomeric valve and pump systems); U.S. Pat. No. 6,645,432 (Microfluidic systems including three-dimensionally arrayed channel networks); U.S. Patent Application publication Nos. 2004/0115838, 20050072946; 20050000900; 20020127736; 20020109114; 20040115838; 20030138829; 20020164816; 20020127736; and 20020109114; PCT patent publications WO 2005/084191; WO05030822A2; and WO 01/01025; Quake & Scherer, 2000, "From micro to nanofabrication with soft materials" Science 290: 1536-40; Xia et al., 1998, "Soft lithography" Angewandte Chemie-International Edition 37:551-575; Unger et al., 2000, "Monolithic microfabricated valves and pumps by multilayer soft lithography" *Science* 288:113-116; Thorsen et al., 2002, "Microfluidic large-scale integration" *Science* 298:580-584; Chou et al., 2000, "Microfabricated Rotary Pump" Biomedical Microdevices 3:323-330; Liu et al., 2003, "Solving the "world-to-chip" interface problem with a microfluidic matrix" *Analytical Chemistry* 75, 4718-23;" Hong et al, 2004, "A nanoliter-scale nucleic acid processor with parallel architecture" *Nature Biotechnology* 22:435-39; Fiorini and Chiu, 2005, "Disposable microfluidic devices: fabrication, function, and application" *Biotechniques* 38:429-46; Beebe et al., 2000, "Microfluidic tectonics: a comprehensive construction platform for microfluidic systems." *Proc. Natl. Acad. Sci. USA* 97:13488-13493; Rolland et al., 2004, "Solvent-resistant photocurable "liquid Teflon" for microfluidic device fabrication" *J. Amer. Chem. Soc.* 126:2322-2323; Rossier et al., 2002, "Plasma etched polymer microelectrochemical systems" *Lab Chip* 2:145-150; Becker et al., 2002, "Polymer microfluidic devices" Talanta 56:267-287; Becker et al., 2000, and other references cited herein and found in the scientific and patent literature.

i. Layer and Channel Dimensions

Microfabricated refers to the size of features of an elastomeric structure fabricated in accordance with an embodiment of the present invention. In general, variation in at least one dimension of microfabricated structures is controlled to the micron level, with at least one dimension being microscopic (i.e. below 1000 μm). Microfabrication typically involves semiconductor or MEMS fabrication techniques such as photolithography and spincoating that are designed for to produce feature dimensions on the microscopic level, with at least some of the dimension of the microfabricated structure requiring a microscope to reasonably resolve/image the structure.

In preferred aspects, flow channels preferably have width-to-depth ratios of about 10:1. A non-exclusive list of other ranges of width-to-depth ratios in accordance with embodiments of the present invention is 0.1:1 to 100:1, more preferably 1:1 to 50:1, more preferably 2:1 to 20:1, and most preferably 3:1 to 15:1. In an exemplary aspect, flow channels have widths of about 1 to 1000 microns. A non-exclusive list of other ranges of widths of flow channels in accordance with embodiments of the present invention is 0.01 to 1000 microns, more preferably 0.05 to 1000 microns, more preferably 0.2 to 500 microns, more preferably 1 to 250 microns, and most preferably 10 to 200 microns. Exemplary channel widths include 0.1 μm, 1 μm, 2 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, and 250 μm.

Flow channels have depths of about 1 to 100 microns. A non-exclusive list of other ranges of depths of flow channels in accordance with embodiments of the present invention is 0.01 to 1000 microns, more preferably 0.05 to 500 microns, more preferably 0.2 to 250 microns, and more preferably 1 to 100 microns, more preferably 2 to 20 microns, and most preferably 5 to 10 microns. Exemplary channel depths include including 0.01 μm, 0.02 μm, 0.05 μm, 0.1 μm, 0.2 μm, 0.5 μm, 1 μm, 2 μm, 3 μm, 4 μm, 5 μm, 7.5 μm, 10 μm, 12.5 μm, 15 μm, 17.5 μm, 20 μm, 22.5 μm, 25 μm, 30 μm, 40 μm, 50 μm, 75 μm, 100 μm, 150 μm, 200 μm, and 250 μm.

Elastomeric layers may be cast thick for mechanical stability. In an exemplary embodiment, a layer is 50 microns to over a centimeter thick, and more preferably approximately 4 mm thick. A non-exclusive list of ranges of thickness of the elastomer layer in accordance with other embodiments of the present invention is between about 0.1 micron to 1 cm, 1 micron to 1 cm, 10 microns to 0.5 cm, 100 microns to 10 mm.

Accordingly, membranes separating flow channels have a typical thickness of between about 0.01 and 1.000 microns, more preferably 0.05 to 500 microns, more preferably 0.2 to 250, more preferably 1 to 100 microns, more preferably 2 to 50 microns, and more preferably 5 to 40 microns, and most preferably 10-25 μm. Exemplary membrane thicknesses include 0.01 μm, 0.02 μm, 0.03 μm, 0.05 μm, 0.1 μm, 0.2 μm, 0.3 μm, 0.5 μm, 1 μm, 2 μm, 3 μm, 5 μm, 7.5 μm, 10 μm, 12.5 μm, 15 μm, 17.5 μm, 20 μm, 22.5 μm, 25 μm, 30 μm, 40 μm, 50 μm, 75 μm, 100 μm, 150 μm, 200 μm, 250 μm, 300 μm, 400 μm, 500 μm, 750 μm, and 1000 μm.

ii. Reaction Chambers

Reaction chamber dimensions in an FCS device can vary over a broad range. In embodiments of the present invention, reaction volumes ranging from 10 picoliters to 100 nanoliters are utilized. In some embodiments, reaction volumes greater than 100 nanoliters are utilized. Reaction chambers may also be in the microliter, nanoliter, picoliter, femtoliter or lower range of volume. In one embodiment, the reaction chamber volume is between 1-1000 femtoliters. Merely by way of example, in an embodiment, the methods and systems of the present invention are utilized with reaction volumes of 10 picoliters, 50 picoliters, 100 picoliters, 250 picoliters, 500 picoliters, and 1 nanoliter. In alternative embodiments, reaction volumes of 2 nanoliters, 5 nanoliters, 10 nanoliters, 20 nanoliters, 30 nanoliters, 40 nanoliters, 50 nanoliters, 75 nanoliters, and 100 nanoliters are utilized. In another embodiment, the reaction chamber volume is between 1-1000 picoliters. In another embodiment, the reaction chamber volume is between 0.01-100 nanoliters, preferably between 1-75 nanoliters. In one embodiment the reaction chamber volume is about 50 nanoliters. In one embodiment the reaction chamber volume is about 7.6 nanoliters. In another embodiment, the reaction chamber volume is 6 The volume defined for the first solution in the flow channel (the slug volume or carry-on volume) is a fraction of the reaction chamber volume. In various embodiments, the fraction may be 7/8, 3/4, 5/8, 1/2, 3/8, 1/4, 1/5, 1/8, 1/10, 1/12, 1/20, 1/25, 1/50, 1/100, or less of the total reaction chamber volume. Preferably the fraction is less than 1/2, more preferably less than 1/4, more preferably less than 1/8. In some embodiments the volume of reagent solution is about 1/10th the volume of the reaction chamber and the volume of the sample solution is about 9/10th of the volume of the reaction chamber.

Reaction chambers are often cuboid due in part to relative ease of manufacture, however other shapes can be used. In preferred embodiments the chamber comprises internal edges (i.e., is not spherical). These edges enhance mixing of reagent and sample. A cuboid chamber has 12 internal edges. In one embodiment the reagent chamber has at least 2 internal edges (e.g., a cylinder). More often the chamber has at least 10, at least 12, at least 14, at least 16, or at least 20 internal edges.

iii. Elastomeric Valves

As discussed above, in preferred embodiments the FCS device comprises elastomeric materials and monolithic valves, such as a pressure-actuated "elastomeric valve." A pressure-actuated elastomeric valve consists of a configuration in which two microchannels are separated by an elastomeric segment that can be deflected into or retracted from one of the channels (e.g., a flow channel) in response to an actuation force applied to the other channel (e.g., a control channel). Examples of elastomeric valves include upwardly-deflecting valves (see, e.g., US 20050072946), downwardly deflecting valves (see, e.g., U.S. Pat. No. 6,408,878), side actuated valves (see, e.g., US 20020127736, e.g., paragraphs 0215-0219); normally-closed valves (see, e.g., U.S. Pat. No. 6,408,878 B2 and U.S. Pat. No. 6,899,137) and others. In some embodiments a device can have a combination of valves (e.g., upwardly deflecting valves and downwardly deflecting valves). Valves can be actuated by injecting gases (e.g., air, nitrogen, and argon), liquids (e.g., water, silicon oils, perfluoropolyalkylether, and other oils), solutions containing salts and/or polymers (including but not limited to polyethylene glycol, glycerol and carbohydrates) and the like into the control channel. Some valves can be actuated by applying a vacuum to the control channel.

iv. Multilayer Soft Lithography Construction Techniques and Materials

The microfluidic devices disclosed herein are typically constructed at least in part from elastomeric materials and constructed by single and multilayer soft lithography (MSL) techniques and/or sacrificial-layer encapsulation methods (see, e.g., Unger et al., 2000, *Science* 288:113-116, and PCT Publication WO 01/01025, both of which are incorporated by reference herein in their entirety for all purposes). Utilizing such methods, microfluidic devices can be designed in which solution flow through flow channels of the device is controlled, at least in part, with one or more control channels that are separated from the flow channel by an elastomeric membrane or segment. This membrane or segment can be deflected into or retracted from the flow channel with Which a control channel is associated by applying an actuation force to the control channels. By controlling the degree to which the membrane is deflected into or retracted out from the flow channel, solution flow can be slowed or entirely blocked through the flow channel. Using combinations of control and flow channels of this type, one can prepare a variety of different types of valves and pumps for regulating solution flow as described in extensive detail in Unger et al., 2000, *Science* 288:113-116, PCT Publications WO/02/43615 and WO 01/01025, and other references cited herein and known in the art.

Soft Lithographic Bonding:

Preferably, elastomeric layers are bonded together chemically, using chemistry that is intrinsic to the polymers comprising the patterned elastomer layers. Most preferably, the bonding comprises two component "addition cure" bonding.

In one aspect, the various layers of elastomer are bound together in a heterogenous bonding in which the layers have a different chemistry. Alternatively, a homogenous bonding may be used in which all layers would be of the same chemistry. Thirdly, the respective elastomer layers may optionally be glued together by an adhesive instead. In a fourth aspect, the elastomeric layers may be thermoset elastomers bonded together by heating.

In one aspect of homogeneous bonding, the elastomeric layers are composed of the same elastomer material, with the same chemical entity in one layer reacting with the same chemical entity in the other layer to bond the layers together. In one embodiment, bonding between polymer chains of like elastomer layers may result from activation of a crosslinking agent due to light, heat, or chemical reaction with a separate chemical species.

Alternatively in a heterogeneous aspect, the elastomeric layers are composed of different elastomeric materials, with a first chemical entity in one layer reacting with a second chemical entity in another layer. In one exemplary heterogenous aspect, the bonding process used to bind respective elastomeric layers together may comprise bonding together two layers of RTV 615 silicone. RTV 615 silicone is a two-part addition-cure silicone rubber. Part A contains vinyl groups and catalyst; part B contains silicon hydride (Si—H) groups. The conventional ratio for RTV 615 is 10A:1B. For bonding, one layer may be made with 30A:1B (i.e. excess vinyl groups) and the other with 3A:1B (i.e. excess Si—H groups). Each layer is cured separately. When the two layers are brought into contact and heated at elevated temperature, they bond irreversibly forming a monolithic elastomeric substrate.

Alternatively, other bonding methods may be used, including activating the elastomer surface, for example by plasma exposure, so that the elastomer layers/substrate will bond when placed in contact. For example, one possible approach to bonding together elastomer layers composed of the same material is set forth by Duffy et al, "Rapid Prototyping of Microfluidic Systems in Poly (dimethylsiloxane)", *Analytical Chemistry* (1998), 70, 4974-4984, incorporated herein by reference. This paper discusses that exposing polydimethylsiloxane (PDMS) layers to oxygen plasma causes oxidation of the surface, with irreversible bonding occurring when the two oxidized layers are placed into contact.

Yet another approach to bonding together successive layers of elastomer is to utilize the adhesive properties of uncured elastomer. Specifically, a thin layer of uncured elastomer such as RTV 615 is applied on top of a first cured elastomeric layer. Next, a second cured elastomeric layer is placed on top of the uncured elastomeric layer. The thin middle layer of uncured elastomer is then cured to produce a monolithic elastomeric structure. Alternatively, uncured elastomer can be applied to the bottom of a first cured elastomer layer, with the first cured elastomer layer placed on top of a second cured elastomer layer. Curing the middle thin elastomer layer again results in formation of a monolithic elastomeric structure.

Elastomeric layers may be created by spin-coating an RTV mixture on microfabricated mold at 2000 rpm for 30 seconds yielding a thickness of approximately 40 microns. Additional elastomeric layers may be created by spin-coating an RTV mixture on microfabricated mold. Both layers may be separately baked or cured at about 80° C. for 1.5 hours. The additional elastomeric layer may be bonded onto first elastomeric layer at about 80° C. for about 1.5 hours.

Suitable Elastomeric Materials:

Allcock et al, Contemporary Polymer Chemistry, 2nd Ed. describes elastomers in general as polymers existing at a temperature between their glass transition temperature and liquefaction temperature. Elastomeric materials exhibit elastic properties because the polymer chains readily undergo torsional motion to permit uncoiling of the backbone chains in response to a force, with the backbone chains recoiling to assume the prior shape in the absence of the force. In general, elastomers deform when force is applied, but then return to their original shape when the force is removed. The elasticity exhibited by elastomeric materials may be characterized by a Young's modulus.

The systems of the present invention may be fabricated from a wide variety of elastomers. In an exemplary aspect, elastomeric layers may preferably be fabricated from silicone rubber. However, other suitable elastomers may also be used.

In an exemplary aspect of the present invention, the present systems are fabricated from an elastomeric polymer such as GE RTV 615 (formulation), a vinyl-silane crosslinked (type) silicone elastomer (family). However, the present systems are not limited to this one formulation, type or even this family of polymer; rather, nearly any elastomeric polymer is suitable. An important requirement for the preferred method of fabrication of the present microvalves is the ability to bond multiple layers of elastomers together. In the case of multilayer soft lithography, layers of elastomer are cured separately and then bonded together. This scheme requires that cured layers possess sufficient reactivity to bond together. Either the layers may be of the same type, and are capable of bonding to themselves, or they may be of two different types, and are capable of bonding to each other. Other possibilities include the use an adhesive between layers and the use of thermoset elastomers.

Given the tremendous diversity of polymer chemistries, precursors, synthetic methods, reaction conditions, and potential additives, there are a huge number of possible elastomer systems that could be used to make monolithic elastomeric microvalves and pumps. Variations in the materials used will most likely be driven by the need for particular material properties, i.e. solvent resistance, stiffness, gas permeability, or temperature stability.

There are many, many types of elastomeric polymers. A brief description of the most common classes of elastomers is presented here, with the intent of showing that even with relatively "standard" polymers, many possibilities for bonding exist. Common elastomeric polymers include polyisoprene, polybutadiene, polychloroprene, polyisobutylene, poly(styrene-butadiene-styrene), the polyurethanes, and silicones. A non-exclusive list of elastomeric materials which may be utilized in connection with the present invention includes polyisoprene, polybutadiene, polychloroprene, polyisobutylene, poly(styrene-butadiene-styrene), the polyurethanes, and silicone polymers; or poly(bis(fluoroalkoxy) phosphazene) (PNF, Eypel-F), perfluoropolyalkylether siloxane block copolymer, poly(carborane-siloxanes) (Dexsil), poly(acrylonitrile-butadiene) (nitrile rubber), poly(1-butene), poly(chlorotrifluoroethylene-vinylidene fluoride) copolymers (Kel-F), poly(ethyl vinyl ether), poly(vinylidene fluoride), poly(vinylidene fluoride-hexafluoropropylene) copolymer (Viton), elastomeric compositions of polyvinylchloride (PVC), polysulfone, polycarbonate, polymethylmethacrylate (PMMA), and polytertrafluoro-ethylene (Teflon).

a. Polyisoprene, Polybutadiene, Polychloroprene:

Polyisoprene, polybutadiene, and polychloroprene are all polymerized from diene monomers, and therefore have one double bond per monomer when polymerized. This double bond allows the polymers to be converted to elastomers by vulcanization (essentially, sulfur is used to form crosslinks between the double bonds by heating). This would easily allow homogeneous multilayer soft lithography by incomplete vulcanization of the layers to be bonded; photoresist encapsulation would be possible by a similar mechanism.

b. Polyisobutylene:

Pure polyisobutylene has no double bonds, but is crosslinked to use as an elastomer by including a small amount ($\approx 1\%$) of isoprene in the polymerization. The isoprene monomers give pendant double bonds on the polyisobutylene backbone, which may then be vulcanized as above.

c. Poly(styrene-butadiene-styrene):

Poly(styrene-butadiene-styrene) is produced by living anionic polymerization (that is, there is no natural chain-terminating step in the reaction), so "live" polymer ends can exist in the cured polymer. This makes it a natural candidate for the present photoresist encapsulation system (where there will be plenty of unreacted monomer in the liquid layer poured on top of the cured layer). Incomplete curing would allow homogeneous multilayer soft lithography (A to A bonding). The chemistry also facilitates making one layer with extra butadiene ("A") and coupling agent and the other layer ("B") with a butadiene deficit (for heterogeneous multilayer soft lithography). SBS is a "thermoset elastomer", meaning that above a certain temperature it melts and becomes plastic (as opposed to elastic); reducing the temperature yields the elastomer again. Thus, layers can be bonded together by heating.

d. Polyurethanes:

Polyurethanes are produced from di-isocyanates (A-A) and di-alcohols or di-amines (B-B); since there are a large variety of di-isocyanates and di-alcohols/amines, the number of different types of polyurethanes is huge. The A vs. B nature of the polymers, however, would make them useful for heterogeneous multilayer soft lithography just as RTV 615 is: by using excess A-A in one layer and excess B-B in the other layer.

e. Silicones:

Silicone polymers probably have the greatest structural variety, and almost certainly have the greatest number of commercially available formulations. The vinyl-to-(Si—H) crosslinking of RTV 615 (which allows both heterogeneous multilayer soft lithography and photoresist encapsulation) has already been discussed, but this is only one of several crosslinking methods used in silicone polymer chemistry.

Cross Linking Agents:

In addition to the use of the simple "pure" polymers discussed above, crosslinking agents may be added. Some agents (like the monomers bearing pendant double bonds for vulcanization) are suitable for allowing homogeneous (A to A) multilayer soft lithography or photoresist encapsulation; in such an approach the same agent is incorporated into both elastomer layers. Complementary agents (i.e. one monomer bearing a pendant double bond, and another bearing a pendant Si—H group) are suitable for heterogeneous (A to B) multilayer soft lithography. In this approach complementary agents are added to adjacent layers.

Other Materials:

In addition, polymers incorporating materials such as chlorosilanes or methyl-, ethyl-, and phenylsilanes, and polydimethylsiloxane (PDMS) such as Dow Chemical Corp. Sylgard 182, 184 or 186, or aliphatic urethane diacrylates such as (but not limited to) Ebecryl 270 or Irr 245 from UCB Chemical may also be used.

Doping and Dilution:

Elastomers may also be "doped" with uncrosslinkable polymer chains of the same class. For instance RTV 615 may be diluted with GE SF96-50 Silicone Fluid. This serves to reduce the viscosity of the uncured elastomer and reduces the Young's modulus of the cured elastomer. Essentially, the crosslink-capable polymer chains are spread further apart by the addition of "inert" polymer chains, so this is called "dilution". RTV 615 cures at up to 90% dilution, with a dramatic reduction in Young's modulus.

Other examples of doping of elastomer material may include the introduction of electrically conducting or magnetic species, as described in detail below in conjunction with alternative methods of actuating the membrane of the device. Should it be desired, doping with fine particles of material having an index of refraction different than the elastomeric material (i.e. silica, diamond, sapphire) is also contemplated as a system for altering the refractive index of the material. Strongly absorbing or opaque particles may be added to render the elastomer colored or opaque to incident radiation, which may be of benefit in an optically addressable system.

Finally, by doping the elastomer with specific chemical species, these doped chemical species may be presented at the elastomer surface, thus serving as anchors or starting points for further chemical derivitization.

vi. Vent Channels

In some embodiments, the FCS device has channels, referred to as "vent channels" positioned to accelerate or facilitate withdrawal of gas from the reaction chamber or channels to facilitate filling (e.g., dead-end or blind filling). See PCT Publication. WO 2006/071470, incorporated herein by reference. A vent channel system comprises channels separated from, e.g., a sample (or reagent) bus line by a thin gas permeable (e.g., elastomeric) membrane. The vent channels typically lie over or under a bus line (e.g., in a vent layer or control layer). Vapor and gasses are expelled out of the bus line by passing through an intervening gas permeable material (such as an elastomer, and enters the vent channels(s). Vapor and gasses can diffuse into the vent channel or removal can be accelerated by reducing the pressure in the vent channel relative to the bus line. This reduction can be achieved, for example, by flowing dry gas (e.g., air or $N_2$) through the vent channel(s) or drawing a vacuum through the channel(s), or by any other method that reduces vent channel pressure (including reduction caused by Bernoulli's principle).

The dimensions of vent channels can vary widely. In an exemplary aspect, vent channels have at least one cross-sectional dimension in the range of 0.05 to 1000 microns, often 10 to 500 microns, and most often 50 to 200 microns. In some embodiments, the channel height is not more than about 500 microns or less than about 20 microns (in some embodiments, not more than about 250 microns or less than about 50 microns) and the channel width is not more than 5000 microns or less than 20 microns). In one embodiment, vent channels have rectangular cross-sectional dimensions of about 15 microns×50 microns. In some embodiments, vent channels preferably have width-to-depth ratios of about 1:10 to 100:1, such as between about 2:1 and 1:2, and sometimes about 1:1. In embodiments in which a vacuum is applied to a vent channel dimensions may be selected to avoid collapse of the channel under vacuum (e.g., higher height:width ratios). However, the vent channels are not limited to these particular dimensions or proportions.

As noted above, in some embodiments, the lumen of the vent channel(s) is separated from the interior of the bus line by less than 1000 microns, such as from 0.05 to 1000 microns, often from 1 to 500 microns, often from 1 to 200 microns, and most often from 5 to 50 microns. In one embodiment, a vent is placed below the sample bus line consisting of a group of six 15×50 micron channels separated from the bus line by a 15 micron membrane (gas-permeable). In another embodiment the bus line hexfurcates into six parallel lines (each 50 microns wide) that cross over the six vent lines, thus increasing the amount of membrane area to facilitate vapor and/or gas expulsion With reference to an elastomeric or partially elastomeric device, a system of vent channel can lie in an elastomer layer one side of which constitutes a portion of the interior surface of the bus line. For example, in a "wholly" elastomeric device the vent channels may lie in the elastomer layer above or below the flow channel layer (and, for devices with control channels, on the side of the flow layer opposite the control channel layer or in the control channel layer). Vent channels may also be incorporated into the flow channel layer. In some embodiments, providing vent channels above the bus line is the optimal arrangement. However, it is generally easier to fabricate an MSL chip with the vent below the bus line (e.g., as part of the control layer).

vii. Characteristics and Fabrication of Hybrid and Non-Elastomeric FCS Devices

As noted, a variety of materials can be used in fabrication of the FCS device. Devices can be fabricated from combinations of materials. In a hybrid device channels and/or the reaction chamber may be formed from a non-elastomeric substrate, but the channels and/or the reaction chamber have an elastomeric component sufficient that allows the chambers or reaction channels to be blind filled. For example, in some embodiments the walls and ceiling of a reaction chamber and/or flow channels are elastomeric and the floor of the reactor is formed from an underlying nonelastomeric substrate (e.g., glass), while in other embodiments, both the walls and floors of the reaction chamber and/or flow channels are constructed from a nonelastomeric material, and only the ceiling of the reaction chamber and/or flow channels is constructed from elastomer. These channels and chambers are sometimes referred to as "composite structures." See, e.g., US 20020127736. A variety of approaches can be employed to seal the elastomeric and nonelastomeric components of a device, some of which are described in U.S. Pat. No. 6,719,868 and US 20020127736, paragraph [0227] et seq.

Valves of various types are known in the art, including micromechanical valves, elastomeric valves, solid-state microvalves, and others. See, e.g., Felton, 2003, The New Generation of Microvalves" *Analytical Chemistry* 429-432. Two common approaches to fabrication of microelectromechanical (MEMS) structures such as pumps and valves are silicon-based bulk micro-machining (which is a subtractive fabrication method whereby single crystal silicon is lithographically patterned and then etched to form three-dimensional structures), and surface micro-machining (which is an additive method where layers of semiconductor-type materials such as polysilicon, silicon nitride, silicon dioxide, and various metals are sequentially added and patterned to make three-dimensional structures).

In addition to elastomeric valves actuated by pressure-based actuation systems, monolithic valves with an elastomeric component and electrostatic, magnetic, electrolytic and electrokinetic actuation systems may be used. See, e.g., US 20020109114; US 20020127736, e.g., at ¶¶0168-0176; and U.S. Pat. No. 6,767,706 B2 e.g., at §6.3. Likewise other types of valves are known in the art and may be used. See, e.g. Jeon et al. U.S. Pat. No. 6,767,194, incorporated herein by reference, and Luo et al. 2003, "Monolithic valves for microfluidic chips based on thermoresponsive polymer gels" *Electrophoresis* 24:3694-3702. Each of the aforementioned references is incorporated herein by reference.

VIII. Exemplary Reactions

The devices and methods of the invention are useful for any microfluidic process that involves combining mixing two or more solutions. A number of reactions useful for detection, quantitation and analysis of nucleic acids are described below in this section. However, the uses of the FCS device are not limited to "reactions" of this type. Other "reactions" include, but are not limited to, binding interactions (e.g., ligand-antiligand interactions, including antibody-antigen interactions, avidin-biotin interactions), protein-ligand interactions and interactions between cells and various compounds, trapping, chemical or biochemical synthesis, analysis of cells or viruses, and others.

Nucleic acid amplification reactions can be carried out using FCS devices and methods. For example, devices of the invention may be designed to conduct thermal cycling reactions. PCR is perhaps the best known amplification technique. The devices utilized in embodiments of the present invention are not limited to conducting PCR amplifications. Other types of amplification reactions that can be conducted include, but are not limited to, (i) ligase chain reaction (LCR) (see Wu and Wallace, *Genomics* 4:560 (1989) and Landegren et al., *Science* 241:1077 (1988)); (ii) transcription amplification (see Kwoh et al., *Proc. Natl. Acad. Sci. USA* 86:1173 (1989)); (iii) self-sustained sequence replication (see Guatelli et al., *Proc. Nat. Acad. Sci. USA*, 87:1874 (1990)); and (iv) nucleic acid based sequence amplification (NASBA) (see, Sooknanan, R. and Malek, L., *BioTechnology* 13: 563-65 (1995)). Each of the foregoing references is incorporated herein by reference in their entirety for all purposes.

Amplification products (amplicons) can be detected and distinguished (whether isolated in a reaction chamber or at any subsequent time) using routine methods for detecting nucleic acids. Many different signal moieties may be used in various embodiments of the present invention. For example, signal moieties include, but are not limited to, fluorophores, radioisotopes, chromogens, enzymes, antigens, heavy metals, dyes, phosphorescence groups, chemiluminescent groups, minor grove binding probes, and electrochemical detection moieties. Exemplary fluorophores that may be used as signal moieties include, but are not limited to, rhodamine, cyanine 3 (Cy 3), cyanine 5 (Cy 5), fluorescein, VIC™, LIZ™, Tamra™, 5-FAM™, 6-FAM™, and Texas Red (Molecular Probes). (VIC™, LTZ™, Tamra™, 5-FAM™, and 6-FAM™ (all available from Applied Biosystems, Foster City, Calif.). Exemplary radioisotopes include, but are not limited to, $^{32}P$, $^{33}P$, and $^{35}S$. Signal moieties also include elements of multi-element indirect reporter systems, e.g., biotin/avidin, antibody/antigen, ligand/receptor, enzyme/substrate, and the like, in which the element interacts with other elements of the system in order to effect a detectable signal. Certain exemplary multi-element systems include a biotin reporter group attached to a probe and an avidin conjugated with a fluorescent label. Detailed protocols for methods of attaching signal moieties to oligonucleotides can be found in, among other places, G. T. Hermanson, Bioconjugate Techniques, Academic Press, San Diego, Calif (1996) and S. L. Beaucage et al., Current Protocols in Nucleic Acid Chemistry, John Wiley & Sons, New York, N.Y. (2000).

Amplicons comprising double-stranded DNA can be detected using intercalation dyes such as SYBR™, Pico Green (Molecular Probes, Inc., Eugene, Oreg.), ethidium bromide and the like (see Zhu et al., 1994, *Anal. Chem.* 66:1941-48) and/or gel electrophoresis. More often, sequence-specific detection methods are used (i.e., amplicons are detected based on their nucleotide sequence). Examples of detection methods include hybridization to arrays of immobilized oligo or polynucleotides, and use of differentially labeled molecular beacons or other "fluorescence resonance energy transfer" (FRET)-based detection systems. FRET-based detection is a preferred method for detection according to some embodiments of the present invention. In FRET-based assays a change in fluorescence from a donor (reporter) and/or acceptor (quencher) fluorophore in a donor/acceptor fluorophore pair is detected. The donor and acceptor fluorophore pair are selected such that the emission spectrum of the donor overlaps the excitation spectrum of the acceptor. Thus, when the pair of fluorophores are brought within sufficiently close proximity to one another, energy transfer from the donor to the acceptor can occur and can be detected. A variety of assays are known including, for example and not limitation, template extension reactions, quantitative RT-PCR, Molecular Beacons, and Invader assays, these are described briefly below.

FRET and template extension reactions utilize a primer labeled with one member of a donor/acceptor pair and a nucleotide labeled with the other member of the donor/acceptor pair. Prior to incorporation of the labeled nucleotide into the primer during an template-dependent extension reaction, the donor and acceptor are spaced far enough apart that energy transfer cannot occur. However, if the labeled nucleotide is incorporated into the primer and the spacing is sufficiently close, then energy transfer occurs and can be detected. These methods are particularly useful in conducting single base pair extension reactions in the detection of single nucleotide polymorphisms and are described in U.S. Pat. No. 5,945,283 and PCT Publication WO 97/22719. The reactions can optionally be thermocycled to increase signal using the temperature control methods and apparatus described throughout the present specification.

A variety of so-called "real time amplification" methods or "real time quantitative PCR" methods can also be used to determine the quantity of a target nucleic acid present in a sample by measuring the amount of amplification product formed during or after the amplification process itself. Fluorogenic nuclease assays are one specific example of a real time quantitation method Which can be used successfully with the devices described herein. This method of monitoring the formation of amplification product involves the continuous measurement of PCR product accumulation using a dual-labeled fluorogenic oligonucleotide probe—an approach frequently referred to in the literature as the "TaqMan" method. See, for example, U.S. Pat. No. 5,723,591.

With molecular beacons, a change in conformation of the probe as it hybridizes to a complementary region of the amplified product results in the formation of a detectable signal. The probe itself includes two sections: one section at the 5' end and the other section at the 3' end. These sections flank the section of the probe that anneals to the probe binding site and are complementary to one another. One end section is typically attached to a reporter dye and the other end section is usually attached to a quencher dye. In solution, the two end sections can hybridize with each other to form a hairpin loop. In this conformation, the reporter and quencher dye are in sufficiently close proximity that fluorescence from the reporter dye is effectively quenched by the quencher dye. Hybridized probe, in contrast, results in a linearized conformation in which the extent of quenching is decreased. Thus, by monitoring emission changes for the two dyes, it is possible to indirectly monitor the formation of amplification product. Probes of this type and methods of their use are described further, for example, by Piatek et al., 1998, *Nat. Biotechnol.* 16:359-63; Tyagi, and Kramer, 1996, *Nat. Biotechnology* 14:303-308; and Tyagi, et al., 1998, *Nat. Biatechnol.* 16:49-53 (1998).

The Scorpion detection method is described, for example, by Thelwell et al. 2000, Nucleic Acids Research, 28:3752-3761 and Solinas et al., 2001, "Duplex Scorpion primers in SNP analysis and FRET applications" *Nucleic Acids Research* 29:20. Scorpion primers are fluorogenic PCR primers with a probe element attached at the 5'-end via a PCR stopper. They are used in real-time amplicon-specific detection of PCR products in homogeneous solution. Two different formats are possible, the 'stem-loop' format and the 'duplex' format. In both cases the probing mechanism is intramolecular. The basic elements of Scorpions in all formats are: (i) a PCR primer; (ii) a PCR stopper to prevent PCR read-through of the probe element; (iii) a specific probe sequence; and (iv) a fluorescence detection system containing at least one fluorophore and quencher. After PCR extension of the Scorpion primer, the resultant amplicon contains a sequence that is complementary to the probe, which is rendered single-stranded during the denaturation stage of each PCR cycle. On cooling; the probe is free to bind to this complementary sequence, producing an increase in fluorescence, as the quencher is no longer in the vicinity of the fluorophore. The PCR stopper prevents undesirable read-through of the probe by Taq DNA polymerase.

Invader assays (Third Wave Technologies, Madison, Wis.) are used particularly for SNP genotyping and utilize an oligonucleotide, designated the signal probe that is complementary to the target nucleic acid (DNA or RNA) or polymorphism site. A second oligonucleotide, designated the Invader Oligo, contains the same 5' nucleotide sequence, but the 3' nucleotide sequence contains a nucleotide polymorphism. The 'Invader Oligo interferes with the binding of the signal probe to the target nucleic acid such that the 5' end of the signal probe forms a "flap" at the nucleotide containing the polymorphism. This complex is recognized by a structure specific endonuclease, called the Cleavase enzyme, Cleavase cleaves the 5' flap of the nucleotides. The released flap binds with a third probe bearing FRET labels, thereby forming another duplex structure recognized by the Cleavase enzyme. This time the Cleavase enzyme cleaves a fluorophore away from a quencher and produces a fluorescent signal. For SNP genotyping, the signal probe will be designed to hybridize with either the reference (wild type) allele or the variant (mutant) allele. Unlike PCR, there is a linear amplification of signal with no amplification of the nucleic acid. Further details sufficient to guide one of ordinary skill in the art are provided by, for example, Neri, B. P., et al., Advances in Nucleic Acid and Protein Analysis 3826:117-125, 2000) and U.S. Pat. No. 6,706,471.

A variety of multiplex amplification systems can be used in conjunction with the present invention. In one type, several different targets can be detected simultaneously by using multiple differently labeled probes each of which is designed to hybridize only to a particular target. Since each probe has a different label, binding to each target to be detected based on the fluorescence signals. By judicious choice of the different labels that are utilized, analyses can be conducted in which the different labels are excited and/or detected at different wavelengths in a single reaction. See, e.g., Fluorescence Spectroscopy (Pesce et al., Eds.) Marcel Dekker, New York, (1971); White et al., Fluorescence Analysis: A Practical Approach, Marcel Dekker, New York, (1970); Berlman, Handbook of Fluorescence Spectra of Aromatic Molecules, 2nd ed., Academic Press, New York, (1971); Griffiths, Colour and Constitution of Organic Molecules, Academic Press, New York, (1976); Indicators (Bishop, Ed.). Pergamon Press, Oxford, 19723; and Haugland, Handbook of Fluorescent Probes and Research Chemicals, Molecular Probes, Eugene (1992).

Genotyping

Many diseases linked to genome modifications, either of the host organism or of infectious organisms, are the consequence of a change in a small number of nucleotides, frequently involving a change in a single nucleotide. Such single nucleotide changes are referred to as single nucleotide polymorphisms or simply SNPs, and the site at which the SNP occurs is typically referred to as a polymorphic site. The devices described herein can be utilized to determine the identify of a nucleotide present at such polymorphic sites. As an extension of this capability, the devices can be utilized in genotyping analyses. Genotyping involves the determination of whether a diploid organism (i.e., an organism with two copies of each gene) contains two copies of a reference allele (a reference-type homozygote), one copy each of the reference and a variant allele (i.e., a heterozygote), or contains two copies of the variant allele (i.e., a variant-type homozygote). When conducting a genotyping analysis, the methods of the invention can be utilized to interrogate a single variant site. However, as described further below in the section on multiplexing, the methods can also be used to determine the genotype of an individual in many different DNA loci, either on the same gene, different genes or combinations thereof.

Genotyping analyses can be conducted using a variety of different approaches. In these methods, it is generally sufficient to obtain a "yes" or "no" result, i.e., detection need only be able to answer the question whether a given allele is present. Thus, analyses can be conducted only with the primers or nucleotides necessary to detect the presence of one allele potentially at a polymorphic site. However, more typically, primers and nucleotides to detect the presence of each allele potentially at the polymorphic site are included.

Single Base Pair Extension (SBPE) reactions are one technique specifically developed for conducting genotyping analyses. Although a number of SPBE assays have been developed, the general approach is quite similar. Typically, these assays involve hybridizing a primer that is complementary to a target nucleic acid such that the 3' end of the primer is immediately 5' of the variant site or is adjacent thereto. Extension is conducted in the presence of one or more labeled non-extendible nucleotides that are complementary to the nucleotide(s) that occupy the variant site and a polymerase. The non-extendible nucleotide is a nucleotide analog that prevents further extension by the polymerase once incorporated into the primer. If the added non-extendible nucleotide(s) is(are) complementary to the nucleotide at the variant site, then a labeled non-extendible nucleotide is incorporated onto the 3' end of the primer to generate a labeled extension product. Hence, extended primers provide an indication of which nucleotide is present at the variant site of a target nucleic acid. Such methods and related methods are discussed, for example, in U.S. Pat. Nos. 5,846,710; 6,004,744; 5,888,819; 5,856,092; and 5,710,028; and in WO 92/16657.

Genotyping analyses can also be conducted using quantitative PCR methods. In this case, differentially labeled probes complementary to each of the allelic forms are included as reagents, together with primers, nucleotides and polymerase. However, reactions can be conducted with only a single probe, although this can create ambiguity as to whether lack of signal is due to absence of a particular allele or simply a failed reaction. For the typical biallelic case in which two alleles are possible for a polymorphic site, two differentially labeled probes, each perfectly complementary to one of the alleles are usually included in the reagent mixture, together with amplification primers, nucleotides and polymerase. Sample containing the target DNA is introduced into the reaction site. If the allele to which a probe is complementary is present in the target DNA, then amplification occurs, thereby resulting in a detectable signal as described in the detection above. Based upon which of the differential signal is obtained, the identity of the nucleotide at the polymorphic site can be determined. If both signals are detected, then both alleles are present. Thermocycling during the reaction is performed as described in the temperature control section supra.

Gene Expression

Gene expression analysis involves determining the level at which one or more genes is expressed in a particular cell. The determination can be qualitative, but generally is quantitative. In a differential gene expression analysis, the levels of the gene(s) in one cell (e.g., a test cell) are compared to the expression levels of the same genes in another cell (control cell). A wide variety of such comparisons can be made. Examples include, but are not limited to, a comparison between healthy and diseased cells, between cells from an individual treated with one drug and cells from another untreated individual, between cells exposed to a particular toxicant and cells not exposed, and so on. Genes Whose expression levels vary between the test and control cells can serve as markers and/or targets for therapy. For example, if a certain group of genes is found to be up-regulated in diseased cells rather than healthy cells, such genes can serve as markers of the disease and can potentially be utilized as the basis for diagnostic tests. These genes could also be targets. A strategy for treating the disease might include procedures that result in a reduction of expression of the up-regulated genes.

The design of the devices enables them to be utilized in combination with a number of different heating systems. Thus, the devices are useful in conducting diverse analyses that require temperature control. Additionally, those microfluidic devices adapted for use in heating applications can incorporate a further design feature to minimize evaporation of sample from the reaction sites. Devices of this type in general include a number of guard channels and/or reservoirs or chambers formed within the elastomeric device through which water can be flowed to increase the water vapor pressure within the elastomeric material from which the device is formed, thereby reducing evaporation of sample material from the reaction sites.

In another embodiment, a temperature cycling device may be used to control the temperature of the microfluidic devices. Preferably, the micro fluidic device would be adapted to make thermal contact with the microfluidic device. Where the microfluidic device is supported by a substrate material, such as a glass slide or the bottom of a carrier plate, such as a plastic carrier, a window may be formed in a region of the carrier or slide such that the microfluidic device, preferably a device having an elastomeric block, may directly contact the heating/cooling block of the temperature cycling device. In a preferred embodiment, the heating/cooling block has grooves therein in communication with a vacuum source for applying a suction force to the microfluidic device, preferably a portion adjacent to where the reactions are taking place. Alternatively, a rigid thermally conductive plate may be bonded to the microfluidic device that then mates with the heating and cooling block for efficient thermal conduction resulting.

The array format of certain of the devices means the devices can achieve high throughput. Collectively, the high throughput and temperature control capabilities make the devices useful for performing large numbers of nucleic acid amplifications (e.g., polymerase chain reaction (PCR)). Such reactions will be discussed at length herein as illustrative of the utility of the devices, especially of their use in any reaction requiring temperature control. However, it should be understood that the devices are not limited to these particular applications. The devices can be utilized in a wide variety of other types of analyses or reactions.

If the device is to be utilized in temperature control reactions (e.g., thermocycling reactions), then, as described in greater detail infra, the elastomeric device is typically fixed to a support (e.g., a glass slide). The resulting structure can then be placed on a temperature control plate, for example, to control the temperature at the various reaction sites. In the case of thermocycling reactions, the device can be placed on any of a number of thermocycling plates.

Because the devices are made of elastomeric materials that are relatively optically transparent, reactions can be readily monitored using a variety of different detection systems at essentially any location on the microfluidic device. Most typically, however, detection occurs at the reaction site itself (e.g., within a region that includes an intersection of flow channels or at the blind end of a flow channel). The fact that the device is manufactured from substantially transparent materials also means that certain detection systems can be utilized with the current devices that are not usable with traditional silicon-based microfluidic devices. Detection can be achieved using detectors that are incorporated into the device or that are separate from the device but aligned with the region of the device to be detected.

Utilizing systems and methods provided according to embodiments of the present invention, throughput increases are provided over 384 well systems. As an example, throughput increases of a factor of 4, 6, 12, and 24 and greater are provided in some embodiments. These throughput increases are provided while reducing the logistical friction of operations. Moreover the systems and methods of embodiments of the present invention, enable multiple assays for multiple samples. For example, in a specific embodiment 24 samples and 24 assays are utilized to provide a total of 576 data points. In another embodiment, 32 samples and 32 assays are utilized to provide a total of 1024 data points. In another embodiment, 48 samples and 48 assays are utilized to provide 2304 data points. In another embodiment, 96 samples and 48 assays are utilized to provide 4608 data points. In another embodiment, 96 samples and 96 assays are utilized to provide a total of 9,216 data points. In a particular example, the 96 assays are components of a TaqMan 5' Nuclease Assay. See, e.g., U.S. Pat. Nos. 5,538,848, 5,723,591, 5,876,930, 6,030,787, 6,258,569, and 5,804,375, each of which is herein incorporated by reference.

Depending on the geometry of the particular microfluidic device and the size of the microfluidic device and the arrangement of the fluid communication paths and processing site, embodiments of the present invention provide for a range of reaction chamber. In some embodiments, the methods and systems of the present invention are utilized with chamber densities ranging from about 100 chambers per $cm^2$ to about 1 million chambers per $cm^2$. Merely by way of example, microfluidic devices with chamber densities of 250, 1,000, 2,500, 10,000, 25,000, 100,000, and 250,000 chambers per $cm^2$ are utilized according to embodiments of the present invention. In some embodiments, chamber densities in excess of 1,000,000 chambers per $cm^2$ are utilized, although this is not required by the present invention.

Operating microfluidic devices with such small reaction volumes reduces reagent usage as well as sample usage. Moreover, some embodiments of the present invention provide methods and systems adapted to perform real-time detection, when used in combination with real-time quantitative PCR. Utilizing these systems and methods, six orders of linear dynamic range are provided for some applications as well as quantitative resolution high enough to allow for the detection of sub-nanoMolar fluorophore concentrations in 10 nanoliter volumes. One of ordinary skill in the art would recognize many variations, modifications, and alternatives.

Reactions may be designed to produce a detectable signal (indication) including fluorescent indications, but luminescent indications, including chemiluminescent, electroluminescent, electrochemiluminescent, and phospholuminescent, bioluminescent, and other luminescent processes, or any other processing involving any other type of indications that may be detected using a detection device. As will be evident to one of skill in the art, methods and systems operable in the detection and analysis of these fluorescent and luminescent indications are transferable from one indication to another. Additionally, although some embodiments of the present invention utilize spectral filters as optical elements, this is not required by the present invention. Some fluorescent and luminescent applications do not utilize spectral filters in the optical excitation path, the optical emission path, or both. As described herein, other embodiments utilize spectral filters. One of skill in the art will appreciate the differences associated with particular applications.

In some embodiments, a variety of devices and methods for conducting microfluidic analyses are utilized herein, including devices that can be utilized to conduct thermal cycling reactions such as nucleic acid amplification reactions. The devices differ from conventional microfluidic devices in that they include elastomeric components; in some instances, much or all of the device is composed of elastomeric material. For example, amplification reactions can be linear amplifications, (amplifications with a single primer), as well as exponential amplifications (i.e., amplifications conducted with a forward and reverse primer set).

IX. Examples

A. Example 1: Fabrication of a Matrix Reaction Array

A 32×32 elastomeric microfluidic matrix reaction array with slug mixing was constructed and mixing efficiency was compared to a conventional 32×32 elastomeric microfluidic matrix reaction array constructed with a sample/reaction chamber adjacent to a reagent chamber and separated by an interface valve.

The matrix reaction array was constructed with each reaction cell comprising a central 50 nL reaction chamber (400) and a 5 nL slug channel (250) as shown in FIG. 2. The unit reaction cell of FIG. 2 was repeated to prepare a 32×32 matrix fluidic circuit. Using multilayer soft lithography, a first pour layer was patterned with SU8 photoresist to form a mold and then cast with PDMS. The features of the pour layer included a 350 um tall reaction chamber and a 30 um tall slug channel. The other feature, a connecting channel (300) was constructed with a height of 10 um. A second spin layer was prepared with 15 um tall features for sample input channel (220) and control channel 1 (260) and control channel 2 (270). The second layer was laser punched to form the sample-to-slug via (240). The first our layer was aligned and bonded to the second spin layer and the bonded assembly then removed from the resist pattern. The bonded assembly comprising layers 1 and 2 was then bonded to a thin spun base layer to complete the elastomeric assembly.

FIG. 1 depicts a representative portion of the 32×32 matrix fluidic circuit. The matrix circuit was divided by column (e.g., C1, C2, C3, C4) and rows (e.g. R1, R2, R3, R4). The slug channels 250 of cells in a particular column, such as column C4, are in fluidic communication via connecting channels (300). Connecting channel 300 constitutes a fill inlet for the slug channel. A valve defined by a deflectable membrane of control channel 2 (270) can fluidically isolate the slug channels of the individual unit cells of a given column. The isolation of the slug channels from each other is accomplished by pressurization of control channel 2 causing the deflectable membrane portions to deflect into the connecting channels and sealing off flow through the connecting channels. The slug channels of a given column are therefore interconnected in their native state and capable of being isolated upon actuation of control channel 2. A similar arrangement of interconnects exists for the rows of the matrix device. A common bus line, sample input channel (220), exists in the second layer of the device. This bus line provides a common sample input for all of the unit reaction cells of a particular row of the device. The sample input channel is connected to the individual slug channels through the sample-to-slug fluid communication via connecting the sample input channel in the second layer to the first end of the slug channel in the first layer. The second end of the slug channel connects directly to the reaction chamber (400). The configuration of the slug channel allows the first end to be fluidically isolated from the sample-to-slug fluid communication via and the second end to be isolated from the reaction chamber with the actuation the valves formed from control channel 1. The pressurization of control channel 1, which resides in the second layer, causes the deflection of a membrane in the top of the control channel to deflect into slug channel near the first end and the second end to fluidically isolate the ends of the slug channel.

B. Example 2: Demonstration of the Filling and Mixing of a 32×32 Matrix Reaction Array.

Operation of the matrix reaction array was performed by the following steps. In this operation a yellow food dye was used as a surrogate for the first solution (reagent) and a blue food dye was used as a surrogate for the second solution (sample). Flow and mixing could be monitored based on the colored solutions. FIG. 3 illustrates the result of the operation and is based on photomicrographs taken. As noted above, FIG. 3 is illustrative only. The loading time in this experiment was from 10-20 minutes and, under the conditions of the demonstration, diffusion dominated mixing occurred within the reagent channel before the solutions entered the reaction chamber.

Control channel 1 (260) was pressurized to close the valves that fluidically isolate the ends of the slug channel (FIG. 3A). A yellow food dye was introduced under pressure through the connecting channels (300) and the slug channels were blind-filled (FIG. 3B). This step simulates the filling of the slug channel with reagent. Following the filling of the slug channels, control channel 2 (270) is pressurized to actuate the valves that close off the connecting channels (300) and thereby isolate the individual slug channels from the other slug channels in the columns (FIG. 3C). Although all columns in the reaction array and, accordingly, all slug channels, are filled with the same yellow food dye in this example, there is no interconnection between the connecting channels and the slug channels of the individual columns. Following the blind filling of the slug channels and their isolation, a blue food dye was introduced under pressure into all sample input channels (220) (FIG. 3D). The control channels 1 (260) were then depressurized to open the interface valves that were previously closed to isolate the ends of the slug channels (FIG. 3E). The blue food dye that represents the sample in this Example, enters the slug channel at the first end and pushes the reagent into the reaction chamber (FIG. 3F). This resulted in a highly mixed, loaded reaction chamber (400) containing the 5 nL of yellow food dye reagent surrogate and 45 nL of blue food dye sample surrogate (50 nL total reaction chamber volume) (FIG. 3G). Finally, in this demonstration, control channels 1 are pressurized which results in the closure of the interface valves (FIG. 3H). Although all rows in the reaction array and, accordingly, all sample input channels, are filled with the same blue food dye in this example, there is no interconnection between the sample input channels of the individual rows and different samples can be introduced into the individual rows. In the configuration of this Example, 32 separate samples can be simultaneously mixed and loaded into reaction chambers with 32 separate reagents for 1024 individual experiments.

C. Example 3 : Fabrication and Operation of FCS Device (Exemplar 5-Type)

In this example, reaction cells are fabricated in 100 nL (FIG. 5) volumes by multilayer soft lithography. A reaction chamber 400 is prepared on a first spin layer of varying thicknesses. For a 100 nL reaction chamber, a 100 um recess is patterned with SU8 photoresist and a first polydimethylsiloxane (PDMS) elastomeric layer is prepared by spin coating the resist pattern to define a 100 nL reaction chamber (400) with an open side and a closed side. Once the first layer is cured, a via (280) is laser punched through the closed side of the reaction chamber. A second elastomeric layer is prepared by spin coating a resist pattern to define a 10 um rounded reagent slug channel (250) in fluidic communication with a 30 um reagent input flow channel (230). The channels are formed as recesses in the second layer. The reagent input flow channel is formed as a bus channel to connect with additional reagent slug flow channels when forming multiple reaction cells. When the second layer is cured, via (240) is laser punched through the ceiling of one end of the reagent slug flow channel. A third elastomeric layer is prepared as a pour layer over a photoresist mold. The photoresist pattern defines recesses for a first 28 um control channel (260) and a second 28 um control channel (270). The control channels have a widened recess area that is intended to overlie the ceiling membranes of the flow channels for which they are intended to control. When the control channel is sufficiently pressurized, the ceiling membrane of the flow channel that is beneath the widened control channel recess area will be deflected into the flow channel beneath it thus sealing off the flow channel. When pressure is reduced or removed, the ceiling membrane of the flow channel will deflect upward to reopen the flow channel. A narrow portion of the control channel carries the control fluid for pressurizing the control channel. By selecting proper control channel geometries and flow channel ceiling membrane thicknesses, the narrow portion of the control channel overlies portions of flow channels but does not deflect the flow channels ceiling membrane into the flow channel at these intersections upon pressurization of the control channel. Also defined in the third elastomeric layer is recess for a sample inlet channel (220). Once the third elastomeric layer is cured, it is removed from the photoresist mold. The layers are then aligned and assembled—first by assembling the "third" and "second" layers, and then by assembling the "third/second" layer with the "first". The elastomeric layers are bonded together by first plasma treating the surfaces of the layers and then contacting the layers. The layers are aligned such that: 1) the first layer is placed with the reaction chamber opening downward; 2) second elastomeric layer is aligned on top of the first layer so that the reagent slug channel recess (250) is in fluid communication with the slug to reaction chamber via (280); and 3) the third elastomeric layer is aligned so that the recess defining the sample input channel (240) is in fluid communication with the sample to slug via (240). The third elastomeric layer is also aligned so that the recesses that define control channel 1 (260) with a widened control channel recess area overlies two ends of the reagent slug flow channel. The widened control channel recess area of control channel 2 (270) is aligned so that it overlies a portion of the reagent slug flow channel that interfaces to the reagent input flow channel (230). The assembled elastomeric layers form a microfluidic reaction cell that is bonded to a silicon base layer. In this example, the base layer is a solid monolithic slab of silicon that seals the open end of the reaction chamber and also functions as a heat transfer surface for temperature control of reactions such as polymerase chain reaction (PCR).

Reaction chamber volumes of 10 nl and 1.5 nl having the same general design as described above were also prepared, with 60 um recess in the first elastomeric layer that defines the reaction chamber depth and with reduced length and width dimensions.

To operate the carry-slug reaction cell, control channel 1 [260] is pressurized to deflect the elastomeric membrane valve and close the slug reagent flow channel at its interface with the sample to slug via [240] and the slug to reaction chamber via [280]. The reagent input flow channel [230] is pressurized and the entire slug reagent flow channel [250] is blind filled with the desired reagent. Simultaneously, the sample input flow channel is also pressurized and the entire sample flow channel is blind filled up to the valve delineated by control channel 1. Control channel 2 is then pressurized to deflect the elastomeric membrane valve that closes the slug reagent flow channel near its interface with the reagent input flow channel. The sample input flow channel is then re-pressurized and control channel 1 is depressurized to open the slug reagent flow channel at its via connections. The contents of the slug reagent flow channel are then transferred into the reaction chamber through blind filling and under pressure from the sample input flow channel. The volume of the reaction chamber is in excess of the volume of the slug reagent flow channel which allows for sample to continue flowing from the sample input flow channel and the slug reagent flow channel and to fill up the reaction chamber in the amount that is the difference of the reaction chamber volume and the slug reagent flow channel volume. Control channel 1 is repressurized to close off the reaction chamber. The reagent and sample are retained in a mixed solution in the reaction chamber and the reaction is allowed to proceed.

D. Example 4 :Flow Channel Provided with Multiple Mixing Segments

FIG. 7C is a representation of a flow channel that provides for multiple slug mixing segments. Flow channel (250, comprising segments 250*a*, 250*b*, 250*c* and 250*d*) has a first end gated by valve V8 and a second end gated by valve V1 that opens into reaction chamber (400). Along the length of the flow channel are multiple junction inlets: 303, 302, 301, and 300, gated by valves V9, V7, V5, and V3, respectively, Each slug mixing segment is defined by a valve pair that brackets the inlet junction. A first slug mixing segment 250*d* is defined by the segment of the flow channel defined by inlet channel 303 and valves V8 and V6. A second slug mixing segment 250*c* is defined by inlet channel 302 and valves V6 and V4. A third slug mixing segment 250c is defined by inlet channel 301 and valves V4 and V2. A fourth slug mixing segment 250a is defined by inlet channel 300 and valves V2 and V1. In this type of arrangement, multiple solutions may be introduced into the flow channel by blind filing against the valves that define their respective segments. Their inlet junction valves are then closed, the segment valves are opened and the slugs are pushed into the reaction chamber by flow of a solution through the flow channels 220 and 290 to yield a well mixed solution. It is not necessary that all segments of the flow channel are filled with a solution before the carry-on mixing takes place. This gives flexibility in what reagents are used in a particular reaction.

The reaction chamber 400 may have has an optional outlet channel gated by a valve.

E. Example 5: FCS Unit Cell and High Density Array

A high density nanofluidic chip with a FCS design unit cell was constructed. The unit cell was designed for a 10:1 mixing ratio and a 6.75 µL mixing/reaction chamber. The nanofluidic chip was constructed from three elastomeric layers: A first layer containing control and sample bus channels with a layer thickness of approximately 35 µm; a second layer containing reagent bus channels, reagent slug channels, and mixing/reaction chambers with a layer thickness of approximately 4 mm, and a third base layer with a thickness of approximately 100 µm and containing vias for fluidic communication of the nanofluidic device with the external world. As the mixing (and potential reaction) of the sample and the reagent take place in the second layer, vias are formed between the first and second layers to allow transfer of sample from the sample bus (sample input channel) in the first layer to the reagent slug channel of the second layer and, ultimately, allow the flow of the sample into the mixing/reaction chamber. The chip architecture was designed as matrix of 48 rows and 48 columns for a total of 2304 unit cells for mixing and potential reactions. In this design, 48 independent samples can be individually mixed with 48 independent reagents. For a 48×48 matrix design, the features of the unit cell must be replicated across the rows and down the columns of the matrix. For each cell of the matrix of the present example to be independently addressable, each cell requires a unit cell via, or other connection between the first and second layers. In this example, the entire matrix of 2304 unit cells is contained within a 30 mm×30 mm area of the nanofluidic chip.

FIG. 4 is a diagram of a portion of the nanofluidic chip of the present example. The figure shows four of the unit cells arranged in a matrix (two rows and two columns) that are part of the larger 48×48 matrix. The unit cell comprises a mixing or reaction chamber (400), a reagent slug channel (250), a reagent input channel (230), a sample input channel (220), a first control channel (260), and a second control channel (270). In this example, a unit cell via (240) connects the sample input channel to the reagent slug channel through two layers of the nanofluidic chip. A mold was patterned with photoresist that defines a first control Channel (260), a second control channel (270) and sample input channel (220) layer. The narrowest portions of the mold for both types of channels were 15 µm (height) by 35 µm (width). Portions of the first control channel were widened (65 µm) and portion of the second control channel were widened (70 µm) at areas where the valve portions were defined. A layer of polydimethylsiloxane (PDMS) was spin coated over the resist pattern mold to produce the first layer. A second layer was prepared by pouring PDMS over a resist pattern that defined a 10 µm rounded reagent input channel (230) in communication with a 10 µm×85 µm (height×width) reagent slug channel (250). For the resist defining the portion of the reagent input channel that overlays the valve portion of the second control channel (270), the width was 85 um wide. The resist that defines the portion of reagent input channel 230 that interfaces with the reagent slug channel was defined with a height of 30 µm. The resist forming the mold for mixing/reaction chamber 400 was defined with the dimensions of 270 µm×200 µm×125 µm (height×width×length). The second layer was poured to a thickness of approximately 4 mm, allowed to cure, and removed from the resist pattern. The mold-facing-surface of the second layer (bottom) and the non-mold-facing surface of the first layer (top) were plasma treated and the second layer was aligned over the first layer so that the unit cell vias in the first layer are in fluidic communication with the reagent slug channels of the unit cells in the second layer. The second layer was seated on top of the first layer (which remained on the resist pattern mold) and the composition structure was baked in order to bond the layers together. A third, 100 µm thick layer of PDMS was spun on a support and cured. Vias were laser punched in the third layer to provide fluidic communication from the bottom of the device to the reagent bus lines, the sample bus lines, and the first and second control channels. With this configuration, samples and reagents can be loaded from the bottom periphery of the completed nanofluidic device and fluidic pressure can be introduced into the control channels from the bottom of the device. The top surface of the third layer was plasma treated. The first and second layer composite structure was peeled from the first layer resist pattern mold and the mold-facing-side was plasma treated. The bottom of the composite structure was aligned and applied to the third layer to form the completed nanofluidic device. The device was baked to finish bonding the first and second layer composite to the third layer. The device was then removed from the third layer support. The completed device was approximately 43 mm×43 mm×4 mm. The 48 rows and 48 columns of unit cells were contained with an area of the device that was approximately 30 mm×30 mm. The bottom of the device (the surface comprised of the third layer) was coated with an adhesive and bonded to silicon wafer of approximate 33 mm×33 mm×525 µm (width× length×height) that acts as a thermal transfer device for controlling the temperature of the samples and reagents and mixed sample/reagent solutions that are loaded within the nanofluidic device.

The nanofluidic device of this example is of a matrix configuration that allows for the independent mixing of 48 individual samples (first solutions) with 48 individual reagents (second solutions). Therefore there are 48 individual sample input channels and 48 individual reagent input channels. There is a first control channel and a second control channel for each unit cell that can be configured to be independently addressable but, in this example, all first control channels (and the valves that they define) operate together and all second control channels (and the valves that they define) operate together.

To operate the device, the first control channel is pressurized to deflect the valve and close the reagent slug channel at both its interface with the unit cell via and its interface with the mixing/reaction chamber. The reagent input channel is pressurized and the reagent slug channel is blind filled with the desired reagent. The sample input channel is pressurized and the sample input channel is blind filled up to the valve delineated by the first control channel. The second control channel is then pressurized to isolate the reagent slug channel. The first control channel is depressurized to place the sample input channel, reagent slug channel, and mixing/reaction chamber in serial fluidic communication. The flow of sample pushes the contents of the reagent slug channel into the mixing/reaction chamber through blind filling and under pressure from the sample input flow channel. The volume of the reaction chamber is in excess of the volume of the reagent slug channel which allows for sample to continue flowing from the sample input channel through the reagent slug channel and to fill up the mixing/reaction chamber in the amount that is the difference of the mixing/reaction chamber volume and the reagent slug channel volume. The first control channel is then pressurized to close off the reaction chamber. The reagent and sample are retained in a mixed solution in the reaction chamber and the reaction is allowed to proceed. For the device of this example, the thermal transfer device was coupled to a thermal controller for conducting polymerase chain reactions within the mixing/reaction chambers.

F. Example 6: Microfluidic Cheek Valves

This example describes a microfluidic check valve that may be used in various FCS devices. The check valve is comprised two stacked chambers that are separated by a pore-containing membrane. The membrane is composed of an elastomeric material and can be configured in normally open or normally closed state. The normally open check valve, which generally will be used in the FCS devices, can be implemented so that the degree of back pressure necessary to close the valve can be set. Both the normally open and the normally closed version can be readily produced by multi-layer soft lithographic techniques. Further discussion of this valve is found in PCT application PCT/US07/80489, filed 4 Oct. 2007, the entire content of which is enclosed herein in its entirety.

Figure 10:
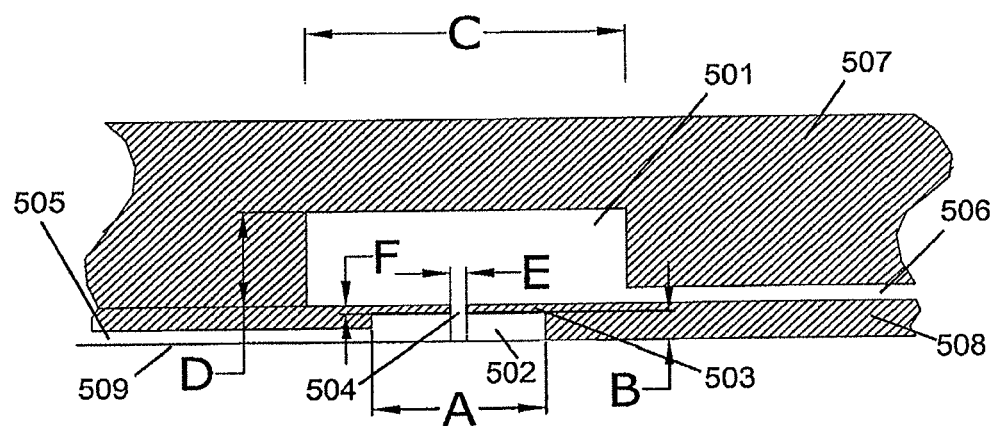
FIG. 10 shows a microfluidic check valve.

FIG. 10 shows an exemplary valve. An upper layer (507) defines an outlet chamber (501) that is in fluidic communication with and outlet channel (506). The outlet chamber has a height, D, and a chamber width, C. The upper layer is adhered to, pressed onto, or bonded to the membrane (503) with its flow channel (504) opening into the outlet chamber. The membrane has a thickness, F, and a flow channel width (or diameter), E. The membrane layer is adhered to, pressed onto, bonded to, or integral with the bottom layer (508) which defines the input chamber (502) and the input flow channel (505). The input chamber has a width (or diameter), A, and a height, B. The layer 508 is adhered to, pressed onto, or bonded to a substrate (either hard or elastomeric) (509) that forms the inlet channel (505).

In this valve, the footprint of the inlet Chamber has a shortest internal width, A, and the inlet chamber has a height, B, the footprint of the outlet chamber has a shortest internal width, C, and the outlet chamber has a height, D. In an embodiment, the membrane channel has a width, E, and a membrane thickness, F. The check valves of the invention will typically have a ratio of C to A is greater than or equal to about 1.2, a ratio of D to B is greater than or equal to about 1.4, and a ratio of A to E is greater than or equal to about 1.9. In further embodiments, the ratio of C to A is equal to or less than about 1.5, equal to or less than about 1.75, equal to or less than about 2, equal to or less that about 2.5, equal to or less than about 3, or greater than 3. The ratio of D to B can be equal to about 1.6 or less, equal to or less than about 1.8, equal to or less than about 2, equal to or less than about 2.5, or equal to or less than about 3, or greater than 3. The ratio of A to E can be equal to or less than about 2.2, equal to or less than about 2.5, equal to or less than about 2.8, equal to or less than about 3, or greater than 3. The membrane thickness, F, can be from about 2 to about 100 um, preferably from about 2 to about 75 um, preferably from about 2 to about 50 um, more preferably from about 2 to about 25 um. In some embodiments, it is preferred that F is less than about 25 um. In some embodiments it is preferred that F is equal to or less than about 10 um. In other embodiments, it is preferred that F is equal to or less than 5 um in thickness. The membrane (503) should have a Young's modulus of about 100 MPA (megapascals) or less. In other embodiments, the Young's modulus of the membrane is about 75 MPA or less, about 50 MPa or less, about 25 MPa or less, about 10 MPa or less, about 8 MPa or less, about 5 MPa or less, or about 2 MPa or less.

The check valve may be used in a device comprising, for example, an inlet channel segment, a check valve, and an outlet channel segment wherein, in the absence of outlet channel flow restrictions, an inlet channel pressure of less than 5 psi (pounds per square inch) is required to produce flow to the outlet channel and wherein substantially no flow occurs from the outlet channel to the inlet channel when an outlet pressure exceeds the inlet channel pressure by about 3 psi. In a further embodiment, the check valve will allow flow to occur from the inlet channel to the outlet channel with an inlet channel pressure of less than 3 psi, 2 psi, 1 psi, 0.5 psi or 0.2 PSI. The initial inlet pressure required to open the check valve will, in some cases, exceed the pressure required to open the check valve in subsequent opening. The opening pressures recited above represent the average opening pressures of 10 repeated openings and closings within a 30 minutes period. In an embodiment, the check valve will close when the pressure in the outlet channel exceeds the pressure in the inlet channel by 2 psi, 1 psi, 0.5 psi, 0.25 psi, 0.1 psi, or 0.05 psi. In a further embodiment, the check valve will close when the pressure in the outlet channel exceeds the pressure in the inlet channel by 0.005 psi.

The check valves are further characterized by a very low dead volume. The check valves my have a dead volume of 100 nL (nanoliters) or less, 50 nL or less, 25 nL or less, 15 nL, or less, 10 nL, or less, 5 nL or less, 4 nL or less, 2.5 nL or less, or, in a further embodiment, about 1 nL.

Figure 11:
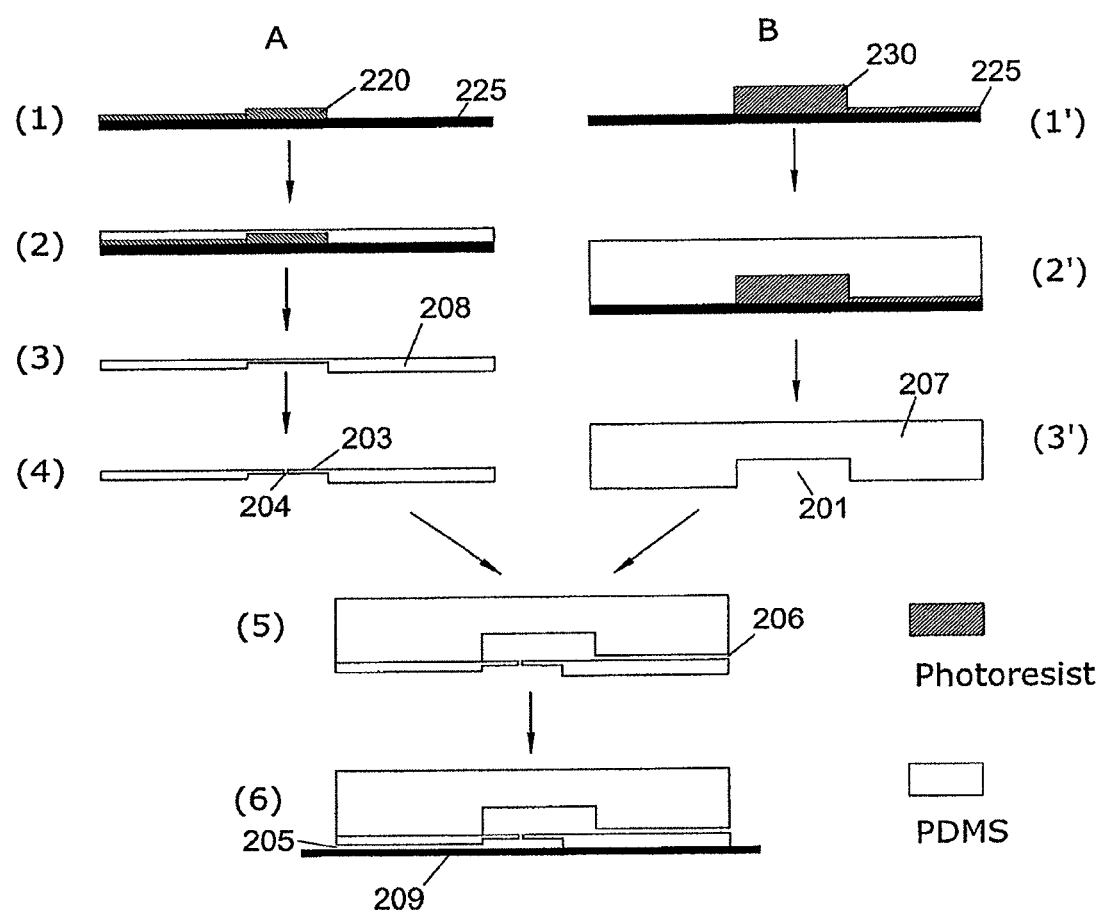
FIG. 11 illustrates a method for fabrication of a microfluidic check valve.

FIG. 11 depicts a fabrication process for a microfluidic check valve. In this Example, the microfluidic check valve utilized two elastomeric layers bonded to each other and attached to a substrate. The substrate could be elastomeric or made of a rigid material. Column A shows the fabrication of the bottom (inlet) chamber (201) and the membrane (203) with a pore (flow channel) (204). Column B shows the fabrication of the top (outlet) chamber (201). The fabrication of the bottom chamber begins with a photoresist lithographic process that produces a mold (220 and 225) defining a chamber with a thin membrane roof and an inlet channel (Column A (1)). An uncured, liquid elastomeric compound such as polydimethylsiloxane (PDMS) is spin-layered onto the mold to evenly distribute the elastomeric liquid on the surface of the mold (Column A (2)) and the elastomeric liquid is cured or is allowed to cure. The elastomer is pealed off the mold, and the mold (Column A (3)) and a hole (204) is punched in the membrane roof (203) of the bottom chamber (Column A (4)). The top chamber is fabricated by a similar process, i.e. by spin-layering an elastomeric liquid on lithographically produced spin mold (230 and 225) that defines the top chamber (201) and the outlet flow channel (206), curing the spun elastomeric layer (207), and removing the cured elastomer with the molded features (Column B (1'), (2') and (3')). The two elastomeric layers are assembled by bonding the layer defining the top chamber onto the elastomeric layer defining the bottom chamber, membrane, and pore. The layers are aligned such that the cavity defining the top chamber is aligned with the membrane roof of the bottom chamber so that sufficient membrane remains unbonded and pliable to allow actuation (5). Assembly of the microfluidic check valve is completed by attachment of the bonded elastomeric structure to a substrate (carrier) by gluing or bonding the side of the elastomeric structure with the cavity defining the bottom chamber to the substrate (209) so that connections to liquid flow channels are obtained (6), Alternate embodiments are possible including a flow channel defined in the carrier to make direct connection to the bottom chamber of connection to a recess in the elastomeric structure that defines an input flow channel leading to the bottom chamber.

G: Example 7: Single Nucleotide Polymorphism (SNP) Analysis

This example describes a comparison of SNP analysis using real-time quantitative PCR (rt-qPCR) carried out using an Exemplar 2-Type FCS device with a 48×48 unit cell array (M48CS2), as described in Example 5, and a prior art device with a 48×48 unit cell array (M48; described in US Pat. Pub. US 2005/0145496, FIG. 21; Fluidigm Corp., S. San Francisco Calif.).

45 different TaqMan assay sets specific for different single nucleotide polymorphisms (SNPs) in salmon DNA were used in this study. Primers and probes were used at final concentrations of 9 uM and 2 uM respectively. The TaqMan probes used were dual-labeled, dark hole quenched oligonucleotides. Forty-six different salmon DNA samples obtained from the Alaska Department of Fish and Game were tested for the presence of the 45 SNPs, in parallel, on M48CS2 and M48 chips, Two negative sample controls and three negative reagent controls (buffer only) were also run on each chip.

Chips were primed, loaded and thermal cycled, using standard PCR conditions, on the Fluidigm Dynamic Array System. Images were captured, and data was analyzed using a BioMark Analysis software package (Fluidigm Corp.) and genotyping call rates were then determined. The call rate obtained on either chip is shown in Table 1, below. The average call rate on the M48CS2 chip was clearly better than that on the M48 chip (99.1% compared to only 93.6%).

TABLE 1

|  |  | M48 | M48Cs2 |
|---|---|---|---|
| SNP02 | One_ALDOB-135 | 95.3 | 97.8 |
| SNP03 | One_CO1 | 100.0 | 91.3 |
| SNP04 | One_CTGF-301 | 100.0 | 100.0 |
| SNP05 | One_Cytb_17 | 100.0 | 100.0 |
| SNP06 | One_Cytb_26 | 100.0 | 100.0 |
| SNP07 | One_HGFA | 93.0 | 100.0 |
| SNP08 | One_Hpal-436 | 86.0 | 100.0 |
| SNP09 | One_Hpal-99 | 97.7 | 100.0 |
| SNP10 | One_ILBr-362 | 97.7 | 100.0 |
| SNP11 | One_KPNA-422 | 97.7 | 100.0 |
| SNP12 | One_LEI-87 | 97.7 | 100.0 |
| SNP13 | One-Prl2 | 100.0 | 100.0 |
| SNP14 | One_RAG1-103 | 100.0 | 100.0 |
| SNP15 | One_RAG3-93 | 100.0 | 100.0 |
| SNP16 | One_RF-112 | 100.0 | 89.1 |
| SNP17 | One_RF-295 | 100.0 | 100.0 |
| SNP18 | One_RH2op395 | 97.7 | 100.0 |
| SNP19 | One_U401-224 | 97.7 | 97.8 |
| SNP20 | One_U404-229 | 100.0 | 100.0 |
| SNP21 | One_U502-167 | 100.0 | 100.0 |
| SNP22 | One_U503-170 | 100.0 | 100.0 |
| SNP23 | One_U504-141 | 100.0 | 100.0 |
| SNP24 | One_U508-533 | 86.0 | 100.0 |
| SNP25 | One_E2 | 95.3 | 97.8 |
| SNP26 | One_GHII-2461 | 100.0 | 100.0 |
| SNP27 | One_GPDH | 100.0 | 97.8 |
| SNP28 | One_GPDH2 | 97.7 | 100.0 |
| SNP29 | One_GPH-414 | 95.3 | 100.0 |
| SNP30 | One_hcs71-220 | 93.0 | 100.0 |
| SNP31 | One_MARCKS_241 | 97.7 | 100.0 |
| SNP32 | One_MHC2_190 | 60.5 | 97.8 |
| SNP33 | One_MHC2_251 | 51.2 | 97.8 |
| SNP34 | One_Ots213-181 | 97.7 | 97.8 |
| SNP35 | One_p53-576 | 97.7 | 100.0 |
| SNP36 | One_plns | 65.1 | 100.0 |
| SNP37 | One_serpin | 86.0 | 100.0 |
| SNP38 | One_STC-410 | 74.4 | 100.0 |
| SNP39 | One_STR07 | 100.0 | 93.5 |
| SNP40 | One_Tf_ex10-750 | 97.7 | 100.0 |
| SNP41 | One_Tf_ex3-182 | 97.7 | 100.0 |
| SNP42 | One_U301-92 | 90.7 | 100.0 |
| SNP43 | One_VIM-569 | 88.4 | 100.0 |
| SNP44 | One_ZNF-61 | 83.7 | 100.0 |
| SNP45 | One_zP3b | 100.0 | 100.0 |
| SNP46 | One_ACBP-79 | 97.7 | 100.0 |
|  | Average | 93.6 | 99.1 |

Although the present invention has been described in detail with reference to specific embodiments, those of skill in the art will recognize that modifications and improvements are within the scope and spirit of the invention, as set forth in the claims which follow. All publications and patent documents (patents, published patent applications, and unpublished patent applications) cited herein are incorporated herein by reference as if each such publication or document was specifically and individually indicated to be incorporated herein by reference. Citation of publications and patent documents is not intended as an admission that any such document is pertinent prior art, nor does it constitute any admission as to the contents or date of the same. The invention having now been described by way of written description and example, those of skill in the art will recognize that the invention can be practiced in a variety of embodiments and that the foregoing description and examples are for purposes of illustration and not limitation of the following claims.

The invention claimed is:

1. A microfluidic device comprising an array of fluidically interconnected unit cells, wherein each unit cell comprises:
   a) a reaction chamber
   b) a main channel connected at one end to a reaction chamber,
   wherein the main channel is divided along its length into segments by valves that when closed prevent movement of solution from one segment to another, such that each segment is delimited by two valves;
   wherein the main channel comprises a first segment and an adjacent second segment, and the first segment lies between the reaction chamber and the second segment;
   c) a first inlet channel connected to the main channel within the first segment at a junction between the valves that delimit the first segment, and a closable or one-way valve that regulates flow from the first segment into the first inlet channel, wherein the first inlet channel terminates at the junction, and wherein the first inlet channel is the only channel connected to the main channel within the first segment;
   d) a second inlet channel connected to the main channel within the second segment, at a junction between the valves that delimit the second segment, and a closable or one-way valve that regulates flow from the second segment into the second inlet channel, wherein the second inlet channel terminates at the junction, and wherein the second inlet channel is the only channel connected to the main channel within the second segment;
   wherein the main channel is in fluidic communication with a source of first sample or reagent;
   the first inlet channel is in fluidic communication with a source of a second sample or reagent, which is different from the first sample or reagent;

the second inlet channel is in fluidic communication with a source of a third sample or reagent, which is different from the first and second sample or reagent.

2. The device of claim 1 comprising a third segment, adjacent to the second segment, and a third inlet channel connected to the main channel within the third segment at a junction between the valves that delimit the third segment, and a closable or one-way valve that regulates flow from the third segment into the third inlet channel,
wherein the third inlet channel terminates at the junction,
wherein the third inlet channel is the only channel connected to the main channel within the third segment; and
wherein the third inlet channel is in fluidic communication with a source of a fourth sample or reagent, which is different from the first, second or third sample or reagent.

3. The device of claim 2, comprising a fourth segment, adjacent to the third segment, and a fourth inlet channel connected to the main channel within the fourth segment at a junction between the valves that delimit the fourth segment, and a closable or one-way valve that regulates flow from the fourth segment into the fourth inlet channel,
wherein the fourth inlet channel terminates at the junction,
wherein the fourth inlet channel is the only channel connected to the main channel within the fourth segment; and
wherein the fourth inlet channel is in fluidic communication with a source of a fifth sample or reagent, which is different from the first, second, third or fourth sample or reagent.

4. The device of claim 1, wherein the first inlet channel is connected to a first bus line that is connected to the source of second sample or reagent and the second inlet channels is connected to a second bus line that is connected to the source of third sample or reagent.

5. The device of claim 1, wherein the volume of the reaction chamber is 0.01 to 100 nanoliters.

6. The device of claim 1, wherein the volume of the reaction chamber is 1-1000 femtoliters.

7. The device of claim 1, wherein the density of unit cells in the array is greater than 10 per mm$^2$.

8. The device of claim 1, wherein the unit cells are connected in rows and columns.

9. The device of claim 1, wherein the device comprises an array of more than 25 rows and more than 25 columns of interconnected unit cells.

10. The device of claim 1, wherein the array comprises at least 1000 unit cells.

11. The device of claim 1, that is fabricated from a gas permeable material.

12. The device of claim 1, that is fabricated from elastomeric material.

13. The device of claim 12, that is fabricated from layers of elastomeric material(s).

14. The device of claim 1, wherein the reaction chamber is a dead-end chamber.

15. The device of claim 1, wherein the combined fluid capacity of the first and second segments is less than the fluid capacity of the reaction chamber.

16. The device of claim 2, wherein the combined fluid capacity of the first, second and third segments is less than the fluid capacity of the reaction chamber.

17. The device of claim 3, wherein the combined fluid capacity of the first, second, third and fourth segments is less than the fluid capacity of the reaction chamber.

* * * * *